(12) United States Patent
Ohno

(10) Patent No.: US 9,981,708 B2
(45) Date of Patent: May 29, 2018

(54) LEANING VEHICLE

(71) Applicant: YAMAHA HATSUDOKI KABUSHIKI KAISHA, Iwata-shi, Shizuoka (JP)

(72) Inventor: Kohsuke Ohno, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days. days.

(21) Appl. No.: 15/279,754

(22) Filed: Sep. 29, 2016

(65) Prior Publication Data
US 2017/0088215 A1    Mar. 30, 2017

(30) Foreign Application Priority Data
Sep. 30, 2015  (JP) ................. 2015-194211

(51) Int. Cl.
| B62K 5/05 | (2013.01) |
| B62K 25/08 | (2006.01) |
| B62K 5/08 | (2006.01) |
| B62K 5/027 | (2013.01) |
| B62K 5/10 | (2013.01) |
| B62K 11/04 | (2006.01) |
| B62K 5/00 | (2013.01) |

(52) U.S. Cl.
CPC .............. *B62K 5/08* (2013.01); *B62K 5/027* (2013.01); *B62K 5/05* (2013.01); *B62K 5/10* (2013.01); *B60G 2300/122* (2013.01); *B60G 2300/45* (2013.01); *B62K 11/04* (2013.01); *B62K 2005/001* (2013.01)

(58) Field of Classification Search
CPC . B62K 5/08; B62K 5/10; B62K 5/027; B62K 2005/001; B60G 2300/122; B60G 2300/45
USPC .......................................... 280/267, 124.103
See application file for complete search history.

(56) References Cited

U.S. PATENT DOCUMENTS

| 8,762,003 | B2 | 6/2014 | Mercier | |
| 2004/0140645 | A1* | 7/2004 | Hayashi | B62K 5/05 280/282 |
| 2011/0006498 | A1 | 1/2011 | Mercier | |
| 2012/0119453 | A1 | 5/2012 | Mercier | |
| 2012/0267870 | A1 | 10/2012 | Mercier | |
| 2013/0113174 | A1 | 5/2013 | Mercier | |
| 2013/0168944 | A1 | 7/2013 | Bartolozzi et al. | |
| 2015/0246704 | A1* | 9/2015 | Takano | B60G 17/005 280/269 |
| 2015/0291241 | A1* | 10/2015 | Takano | B62K 5/05 280/5.509 |

(Continued)

FOREIGN PATENT DOCUMENTS

| CN | 102470909 B | 12/2013 |
| EP | 1 666 346 A1 | 6/2006 |

(Continued)

*Primary Examiner* — Tony H Winner
(74) *Attorney, Agent, or Firm* — Keating and Bennett, LLP

(57) ABSTRACT

In a vehicle, a portion of an upper cross member and a portion of a lower cross member at least temporarily overlap each other without coming into contact with each other when a body frame of the vehicle is caused to lean from an upright state to the left or the right with a maximum angle, as viewed from a front in a direction along a lower intermediate connecting axis.

8 Claims, 11 Drawing Sheets

(56) References Cited

U.S. PATENT DOCUMENTS

| | | | |
|---|---|---|---|
| 2015/0344091 A1* | 12/2015 | Takano | B62K 21/00 |
| | | | 280/269 |
| 2016/0107713 A1* | 4/2016 | Takano | B62K 5/027 |
| | | | 180/210 |
| 2017/0129562 A1 | 5/2017 | Hirakawa et al. | |

FOREIGN PATENT DOCUMENTS

| | | |
|---|---|---|
| EP | 2 899 109 A1 | 7/2015 |
| ES | 2 370 889 A1 | 12/2011 |
| TW | I428252 B | 3/2014 |
| TW | 201620766 A | 6/2016 |
| WO | 2012/007819 A1 | 1/2012 |

* cited by examiner

LEANING VEHICLE

BACKGROUND OF THE INVENTION

1. Field of the Invention

The present invention relates to a vehicle equipped with a leanable body frame and two front wheels.

2. Description of the Related Art

A vehicle described in, for example, International Patent Publication No. 2012/007819 includes a body frame and two front wheels that are arranged side by side in a left-right direction of the body frame.

The vehicle includes a linkage. The linkage is disposed above the two front wheels. The linkage changes positions of the two front wheels relative to the body frame to cause the body frame to lean to the left or right of the vehicle.

The linkage includes an upper cross member, a lower cross member, a left side member and a right side member. The upper cross member is connected to the body frame so as to turn about an upper intermediate connecting axis. The lower cross member is connected to the body frame so as to turn about a lower intermediate connecting axis. A left portion of the upper cross member is connected to an upper portion of the left side member so as to turn about an upper left connecting axis. A right portion of the upper cross member is connected to an upper portion of the right side member so as to turn about an upper right connecting axis. A left portion of the lower cross member is connected to a lower portion of the left side member so as to turn about a lower left connecting axis. A right portion of the lower cross member is connected to a lower portion of the right side member so as to turn about a lower right connecting axis.

There is a desire to increase a leaning angle (a so-called banking angle) of the body frame toward the left or right of the vehicle. In the case of the vehicle described in International Patent Publication No. 2012/007819, however, a configuration is used which prevents the banking angle from exceeding a predetermined value by bringing a portion of the upper cross member and a portion of the lower cross member into abutment with each other. Consequently, in order to increase the banking angle, a distance between the upper cross member and the lower cross member (a distance between the upper intermediate connecting axis and the lower intermediate connecting axis) needs to be increased.

However, in consideration of the necessity of avoiding the interference with the front wheels that are displaced upwards or downwards and the necessity of disposing a steering force transmission between the lower cross member and the two front wheels, it becomes difficult to change the position of the lower cross member so as to be disposed farther downwards. On the other hand, in a case where the position of the upper cross member is changed to be disposed farther upwards, it is inevitable that the size of the vehicle is enlarged. For these reasons it is difficult to ensure a relatively large banking angle.

SUMMARY OF THE INVENTION

Preferred embodiments of the present invention ensure a relatively large banking angle while significantly reducing or minimizing an enlargement in the size of a vehicle that includes a leanable body frame and two front wheels.

The inventor of preferred embodiments of the present invention studied the movable range of the upper cross member and the movable range of the lower cross member when the body frame is caused to lean in the left-right direction of the vehicle. As a result, the inventor discovered that, when the movable range of the upper cross member is arranged directly behind the movable range of the lower cross member, the upper cross member is not brought into contact with the lower cross member when the body frame is caused to lean. Specifically, the movable ranges of the upper cross member and the lower cross member are set so that a portion of the upper cross member and a portion of the lower cross member overlap each other without coming into contact with each other when the vehicle is viewed from the front in a direction along the lower intermediate connecting axis in at least a range of leaning angles of the body frame from zero to the maximum angle.

According to a preferred embodiment of the present invention, a vehicle includes a body frame; a left front wheel and a right front wheel that are arranged side by side in a left-right direction of the body frame; and a linkage disposed above the left front wheel and the right front wheel in an up-down direction of the body frame, disposed behind a front end of the left front wheel and a front end of the right front wheel in a front-rear direction of the body frame, and that changes positions of the left front wheel and the right front wheel relative to the body frame to cause the body frame to lean to the left or to the right of the vehicle, wherein the linkage includes an upper cross member, a lower cross member, a left side member and a right side member; the upper cross member is connected to the body frame so as to be able to turn about an upper intermediate connecting axis; the lower cross member is connected to the body frame so as to be able to turn about a lower intermediate connecting axis; a left portion of the upper cross member is connected to an upper portion of the left side member so as to be able to turn about an upper left connecting axis; a right portion of the upper cross member is connected to an upper portion of the right side member so as to be able to turn about an upper right connecting axis; a left portion of the lower cross member is connected to a lower portion of the left side member so as to be able to turn about a lower left connecting axis; a right portion of the lower cross member is connected to a lower portion of the right side member so as to be able to turn about a lower right connecting axis; and a portion of the upper cross member and a portion of the lower cross member at least temporarily overlap each other without coming into contact with each other when the body frame is caused to lean from an upright state to the left or the right of the vehicle with a maximum angle, as viewed from front of the vehicle in a direction along the lower intermediate connecting axis.

By using the above configuration, since the upper cross member and the lower cross member are not brought into contact with each other according to the leaning angle of the body frame, a large leaning angle of the body frame is ensured while reducing the distance between the upper intermediate connecting axis and the lower intermediate connecting axis as much as possible. Consequently, it is possible to significantly reduce or minimize the enlargement in the size of the linkage in the up-down direction of the body frame remarkably.

In the above vehicle, the linkage is disposed behind the front end of the left front wheel and the front end of the right front wheel. In other words, the front wheels are partially located ahead of the linkage. Thus, by arranging the movable range of the upper cross member and the movable range of the lower cross member to overlap each other partially when viewed from the front, even though the dimension in the front-rear direction of the body frame is increased, the increase of the enlargement in the size of the vehicle in the direction concerned is relatively small.

Consequently, it is possible to ensure a relatively large banking angle while significantly reducing or minimizing the enlargement in the size of the vehicle that includes the leanable body frame and the two front wheels.

The above vehicle is preferably configured as follows. The portion of the upper cross member and the portion of the lower cross member overlap each other when the body frame is caused to lean to the left or the right of the vehicle with the maximum angle, as viewed from the front in the direction along the lower intermediate connecting axis.

By setting the overlapping condition of the movable range of the upper cross member and the lower cross member in the front-rear direction to that described above, it is possible to ensure a larger banking angle while further significantly reducing or minimizing the enlargement in the size of the linkage. Consequently, it is possible to ensure a relatively large banking angle more easily while significantly reducing or minimizing the enlargement in the size of the vehicle that includes the leanable body frame and the two front wheels.

The above vehicle is preferably configured as follows. A portion of the lower cross member that is positioned directly above the lower intermediate connecting axis overlaps the upper cross member, as viewed from the front in the direction along the lower intermediate connecting axis.

By setting the overlapping condition of the movable range of the upper cross member and the lower cross member in the front-rear direction to that described above, it is possible to increase the dimension of the lower cross member in the up-down direction of the body frame. By using this configuration, the rigidity of the lower cross member, in particular, the rigidity of the portion of the lower cross member that is adjacent the lower intermediate connecting axis is enhanced. Consequently, it is possible not only to ensure a relatively large banking angle while significantly reducing or minimizing the enlargement in the size of the vehicle that includes the leanable body frame and the two front wheels but also to improve the stability in the operation of the linkage.

The above vehicle is preferably configured as follows. A portion of a front surface of the upper cross member faces a portion of a rear surface of the lower cross member when the portion of the upper cross member overlaps the lower cross member.

According to this configuration, since the distance between the upper intermediate connecting axis and the lower intermediate connecting axis is further reduced, it is possible to further reduce or minimize the enlargement in the size of the linkage in the up-down direction of the body frame. As described before, by disposing the upper cross member and the lower cross member so that a portion of the front surface of the upper cross member faces a portion of the rear surface of the lower cross member, even though the dimension in the front-rear direction of the body frame is increased, the influence on the increase of the enlargement in the size of the vehicle in the direction concerned is relatively small.

Consequently, it is possible to ensure a relatively large banking angle while further significantly reducing or minimizing the enlargement in the size of the vehicle that includes the leanable body frame and the two front wheels.

In this case, the above vehicle is preferably configured as follows. A front surface of the lower cross member includes a first portion that corresponds to the portion of the rear surface and a second portion that does not correspond to the portion of the rear surface. The first portion is positioned ahead of the second portion in the direction along the lower intermediate connecting axis.

Here, the expression reading "corresponding to the portion of the rear surface" means that the portion of the rear surface passes when the portion of the rear surface is caused to move in parallel to the front in the front-rear direction of the body frame. Namely, the first portion refers to a portion of the front surface of the lower cross member where the portion of the rear surface passes when the portion of the rear surface is caused to move in parallel to the front in the front-rear direction of the body frame. The second portion refers to a portion of the front surface of the lower cross member where the portion of the rear surface does not pass when the portion of the rear surface is caused to move in parallel to the front in the front-rear direction of the body frame.

According to this configuration, a thickness dimension of the first portion of the lower cross member in the direction in which the lower intermediate connecting axis extends is larger than a thickness of the second portion in the direction concerned. Thus, the rigidity of the lower cross member is enhanced while making efficient use of a portion of the space lying behind the lower cross member as a movable range of the upper cross member. Consequently, it is possible not only to ensure a relatively large banking angle while significantly reducing or minimizing the enlargement in the size of the vehicle that includes the leanable body frame and the two front wheels but also to improve the rigidity of the linkage against load.

The above vehicle is preferably configured as follows.

A maximum width dimension of the upper cross member in the up-down direction of the body frame is smaller than a maximum width dimension of the lower cross member in the up-down direction of the body frame.

By setting the maximum width dimension of the upper cross member in the up-down direction of the body frame in the way described above, it is easy to significantly reduce or minimize the expansion of the movable range of the upper cross member. Consequently, it is possible to ensure a relatively large banking angle while further significantly reducing or minimizing the enlargement in the size of the vehicle that includes the leanable body frame and the two front wheels.

The above vehicle is preferably configured as follows. The left front wheel is able to turn about a left steering axis extending in a direction along the left side member. The right front wheel is able to turn about a right steering axis extending in a direction along the right side member. A left portion of the upper cross member is connected to an upper portion of the left side member via an upper left connecting portion. A right portion of the upper cross member is connected to an upper portion of the right side member via an upper right connecting portion. A left portion of the lower cross member is connected to a lower portion of the left side member via a lower left connecting portion. A right portion of the lower cross member is connected to a lower portion of the right side member via a lower right connecting portion. A distance in a direction along the lower left connecting axis between the left steering axis and an end portion of the lower left connecting portion that is farthest from the left steering axis is longer than a distance in the direction along the upper left connecting axis between the left steering axis and an end portion of upper left connecting portion that is farthest from the left steering axis. A distance in a direction along the lower right connecting axis between the right steering axis and an end portion of the lower right connecting portion that is farthest from the right steering axis is longer than a distance in the direction along the upper right connecting axis between the right steering axis and an end portion of upper right connecting portion that is farthest from the right steering axis.

Namely, a dimension of the upper portion of the left side member in a direction in which the upper left connecting axis and the lower left connecting axis extend is smaller than a dimension of the lower portion of the left side member in the same direction. Thus, it is possible to significantly reduce or minimize the enlargement in the size of the structure at a left upper portion of the linkage. In other words, the dimension of the lower portion of the left side member in the direction in which the upper left connecting axis and the lower left connecting axis extend is larger than the dimension of the upper portion of the left side member in the same direction. Consequently, the rigidity of the linkage against a load that is inputted from the road surface through the left front wheel is improved.

Similarly, a dimension of the upper portion of the right side member in a direction in which the upper right connecting axis and the lower right connecting axis extend is smaller than a dimension of the lower portion of the right side member in the same direction. Thus, it is possible to significantly reduce or minimize the enlargement in the size of the structure at a right upper portion of the linkage. In other words, the dimension of the lower portion of the right side member in the direction in which the upper right connecting axis and the lower right connecting axis extend is larger than the dimension of the upper portion of the right side member in the same direction. Consequently, the rigidity of the linkage against a load that is inputted from the road surface through the right front wheel is improved.

As a result, it is possible not only to ensure a relatively large banking angle while further significantly reducing or minimizing the enlargement in the size of the vehicle that includes the leanable body frame and the two front wheels but also to improve the rigidity of the linkage against loads.

The above vehicle preferably includes a left suspension supporting the left front wheel and supported by the left side member so as to be able to turn relative to the left side member; a right suspension supporting the right front wheel and supported by the right side member so as to be able to turn relative to the right side member; an upper left side bearing holding the left suspension at an upper portion of the left side member; a lower left side bearing holding the left suspension at a lower portion of the left side member; an upper right side bearing holding the right suspension at an upper portion of the right side member; and a lower right side bearing holding the right suspension at a lower portion of the right side member. The above vehicle is preferably configured as follows. A lowermost end of the lower left side bearing and a lowermost end of the lower right side bearing are positioned below a lower end of the lower cross member when the body frame is in the upright state.

According to this configuration, it is easy to ensure a large distance between the lower left side bearing and the upper left side bearing that hold the left suspension. By using this configuration, the rigidity of the linkage against vibrations that are inputted from the road surface through the left suspension is improved. In addition, it is easy to ensure a thickness for the left side member that is positioned below the lower end of the lower cross member. This fact also contributes to the improvement in the rigidity of the linkage against the vibrations that are inputted from the road surface through the left suspension.

Similarly, it is easy to ensure a large distance between the lower right side bearing and the upper right side bearing that hold the right suspension. By using this configuration, the rigidity of the linkage against vibrations that are inputted from the road surface through the right suspension is improved. In addition, it is easy to ensure a thickness for the right side member that is positioned below the lower end of the lower cross member. This fact also contributes to the improvement in the rigidity of the linkage against the vibrations that are inputted from the road surface through the right suspension.

As a result, it is possible not only to ensure a relatively large banking angle while significantly reducing or minimizing the enlargement in the size of the vehicle that includes the leanable body frame and the two front wheels but also to improve the rigidity of the linkage against loads.

The above and other elements, features, steps, characteristics and advantages of the present invention will become more apparent from the along detailed description of the preferred embodiments with reference to the attached drawings.

DETAILED DESCRIPTION OF THE PREFERRED EMBODIMENTS

Figure 1:
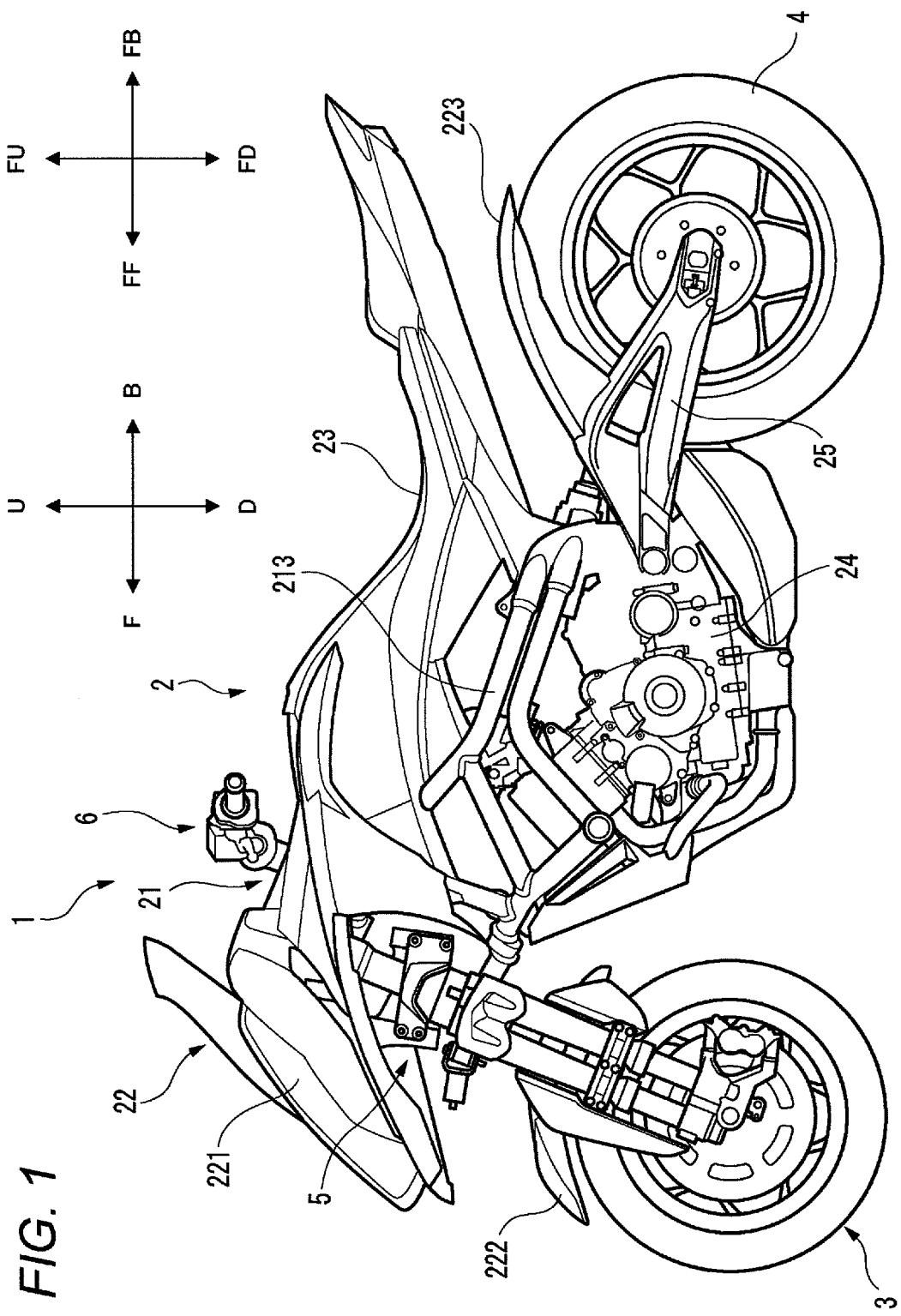
FIG. 1 is a left side view showing an entire vehicle according to a preferred embodiment of the present invention.

Referring to the accompanying drawings, preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

The vehicle turns with a body frame leaning to the left or right of the vehicle from a vertical direction. Then, in addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame" and an "up-down direction of the body frame" mean a front-rear direction, a left-right direction and an up-down direction based on the body frame when viewed from a rider who rides the vehicle. "A side of or sideways of the body frame" means directly on the right or left in the left-right direction of the body frame.

In this description, an expression "extending in the front-rear direction of the vehicle body frame" includes a fact that it extends while being inclined in relation to the front-rear direction of the vehicle body frame and means that it extends in a direction closer to the front-rear direction of the vehicle body frame than the left-right direction and up-down direction of the vehicle body frame.

In this description, an expression "extending in the left-right direction of the vehicle body frame" includes a fact that it extends while being inclined in relation to the left-right direction of the vehicle body frame and means that it extends in a direction closer to the left-right direction of the vehicle body frame than the front-rear direction and up-down direction of the vehicle body frame.

In this description, an expression "extending in the up-down direction of the vehicle body frame" includes a fact that it extends while being inclined in relation to the up-down direction of the vehicle body frame and means that it extends in a direction closer to the up-down direction of the vehicle body frame than the left-right direction and front-rear direction of the vehicle body frame.

In this description, an expression reading the "vehicle is standing upright or in an upright state" or the "body frame is standing upright or in the upright state" means a state in which the vehicle is not steered at all and the up-down direction of the body frame coincides with the vertical direction. In this state, the directions based on the vehicle coincide with the directions based on the body frame. When the vehicle is turning with the body frame caused to lean to the left or right from the vertical direction, the left-right direction of the vehicle does not coincide with the left-right direction of the body frame. Similarly, the up-down direction of the vehicle does not coincide with the up-down direction of the body frame. However, the front-rear direction of the vehicle coincides with the front-rear direction of the body frame.

In this description, an expression reading "directly on the left of a member A in the left-right direction of the body frame" denotes a space through which the member A passes when the member A is moved to the left in the left-right direction of the body frame. An expression reading "directly on the right of the member A" is also defined in the same way.

In this description, an expression reading "on the left of the member A in the left-right direction of the body frame" includes not only the space through which the member A passes when the member A is moved to the left in the left-right direction of the body frame but also a space which expands from the space in directions which are at right angles to the left-right direction of the body frame. An expression reading "on the right of the member A" is also defined in the same way.

In this description, an expression reading "directly above the member A in the up-down direction of the body frame" denotes a space through which the member A passes when the member A is moved upwards in the up-down direction of the body frame. An expression reading "directly below the member A" is also defined in the same way.

In this description, an expression reading "above the member A in the up-down direction of the body frame" includes not only the space through which the member A passes when the member A is moved upwards in the up-down direction of the body frame but also a space which expands from the space in directions which are at right angles to the up-down direction of the body frame. An expression reading "below the member A" is also defined in the same way.

In this description, an expression reading "directly ahead of the member A in the front-rear direction of the body frame" denotes a space through which the member A passes when the member A is moved to the front in the front-rear direction of the body frame. An expression reading "directly behind the member A" is also defined in the same way.

In this description, an expression reading "ahead of the member A in the front-rear direction of the body frame" includes not only the space through which the member A passes when the member A is moved to the front in the front-rear direction of the body frame but also a space which expands from the space in directions which are at right angles to the front-rear direction of the body frame. An expression reading "behind the member A" is also defined in the same way.

In this description, "rotation, rotating or rotated" means that a member is displaced at an angle of 360 degrees or more about an axis thereof. In this description, "turn, turning or turned" means that a member is displaced at an angle less than 360 degrees about an axis thereof.

Referring to FIGS. 1 to 11, a vehicle 1 according to preferred embodiments of the present invention will be described. As shown in FIG. 1, the vehicle 1 includes a vehicle main body 2, two front wheels 3, a rear wheel 4, a linkage 5 and a steering member 6. The vehicle 1 includes a leanable body frame and the two front wheels 3 arranged side by side in the left-right direction of the body frame.

The vehicle main body 2 includes a body frame 21, a body cover 22, a seat 23, an engine unit 24, and a rear arm 25.

In FIG. 1, the body frame 21 is in the upright state. The following description to be made while referring to FIG. 1 is based on the premise that the body frame 21 is in the upright state. FIG. 1 is a left side view resulting when the entire vehicle 1 is viewed from the left in the left-right direction of the body frame 21.

Figure 2:
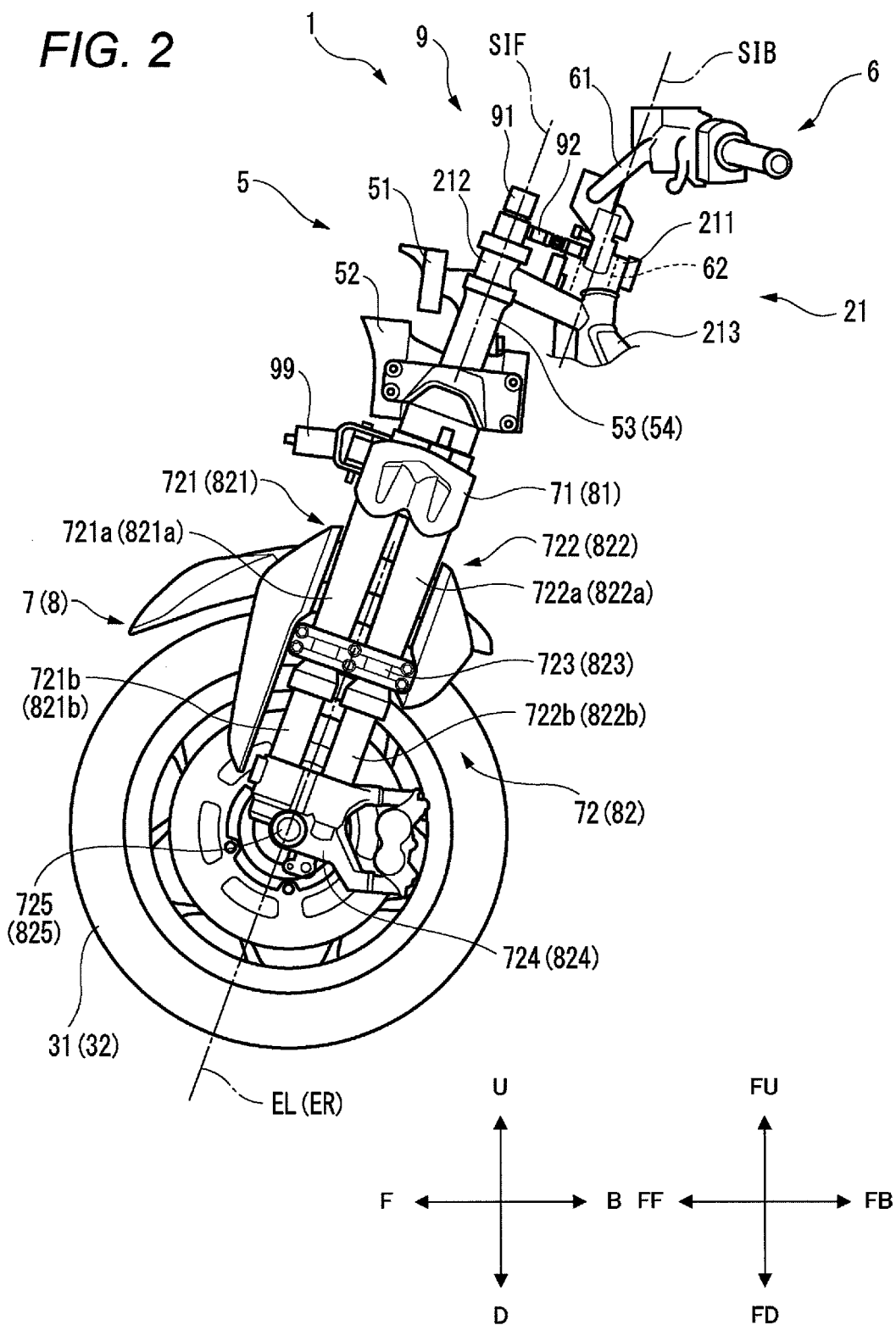
FIG. 2 is a left side view showing a front portion of the vehicle of FIG. 1 in an enlarged manner.

FIG. 2 is a view resulting when a front portion of the vehicle 1 is viewed from the left in the left-right direction of the body frame 21. In FIG. 2, the body frame 21 is in the upright state. The following description to be made while referring to FIG. 2 is based on the premise that the body frame 21 is in the upright state.

The body frame 21 includes a head pipe 211, a link support 212 and a main frame 213. The head pipe 211 supports the steering member 6. The link support 212 supports the linkage 5. The main frame 213 supports the seat 23, the engine unit 24 and the rear arm 25.

The rear arm 25 is disposed directly behind the main frame 213 in the front-rear direction of the body frame 21. The rear arm 25 extends in the front-rear direction of the body frame 21. A front end portion of the rear arm 25 is supported by the main frame 213 and the engine unit 24 and is able to turn about an axis that extends in the left-to-rear direction of the body frame 21. A rear end portion of the rear arm 25 supports the rear wheel 4.

The body cover 22 is a body a portion that covers at least a portion of a group of constituent elements that define the vehicle 1. The body cover 22 includes a front cover 221, a pair of left and right front fenders 222 and a rear front fender 223.

As shown in FIG. 1, the front cover 221 is disposed directly ahead of the seat 23 in the front-rear direction of the body frame 21. The front cover 221 covers the linkage 5, the steering member 6 and at least a portion of a steering force transmission 9. The front cover 221 is not movable relative to the body frame 21. In FIG. 2, the front cover 221 is omitted from illustration.

At least portions of the pair of left and right front fenders 222 are individually disposed directly below the front cover 221. At least portions of the pair of left and right front fenders 222 are disposed directly above the pair of left and right front wheels 3, respectively.

At least a portion of the rear wheel 4 is disposed below the seat 23 in the up-down direction of the body frame 21. At least a portion of the rear wheel 4 is disposed directly below the rear front fender 223 in the up-down direction of the body frame 21.

The vehicle 1 according to the present preferred embodiment is a vehicle on which a rider mounts in a posture of straddling the body frame 21. Namely, when riding the vehicle 1, a portion of the body frame 21, which is disposed ahead of the seat 23 on which the rider sits in the front-rear direction of the body frame 21, is disposed between the legs of the rider. The rider rides on the vehicle 1 in a posture of holding the main frame 213 or the front cover 221 that is positioned ahead of the seat 23 in the front-rear direction of the body frame 21 by the legs therebetween.

When viewing the vehicle 1 from the left-right direction of the body frame 21, the engine unit 24 is disposed ahead of a front end of the rear wheel 4 in the front-rear direction of the body frame 21. The engine unit 24 is not movable relative to the body frame 21. The engine unit 24 is not movable relative to the main frame 213. The engine 24 produces power to drive the vehicle 1. The driving force is transmitted to the rear wheel 4.

The head pipe 211 is disposed at a front portion of the vehicle 1. When viewing the vehicle 1 from the left in the left-right direction of the body frame 21, an upper portion of the head pipe 211 is disposed behind a lower portion of the head pipe 211 in the front-rear direction of the body frame 21.

The steering member 6 includes a handlebar 61 and an upstream steering shaft 62. The upstream steering shaft 62 extends downwards from a central portion of the handlebar 61 in the left-right direction. The upstream steering shaft 62 is supported on the head pipe 211 so as to turn about a rear intermediate steering axis SIB.

The link support 212 is disposed directly ahead of the head pipe 211 in the front-rear direction of the body frame 21. When viewing the vehicle 1 from the left in the left-right direction of the body frame 21, an upper portion of the link support 212 is disposed behind a lower portion of the link support 212 in the front-rear direction of the body frame 21.

Figure 3:
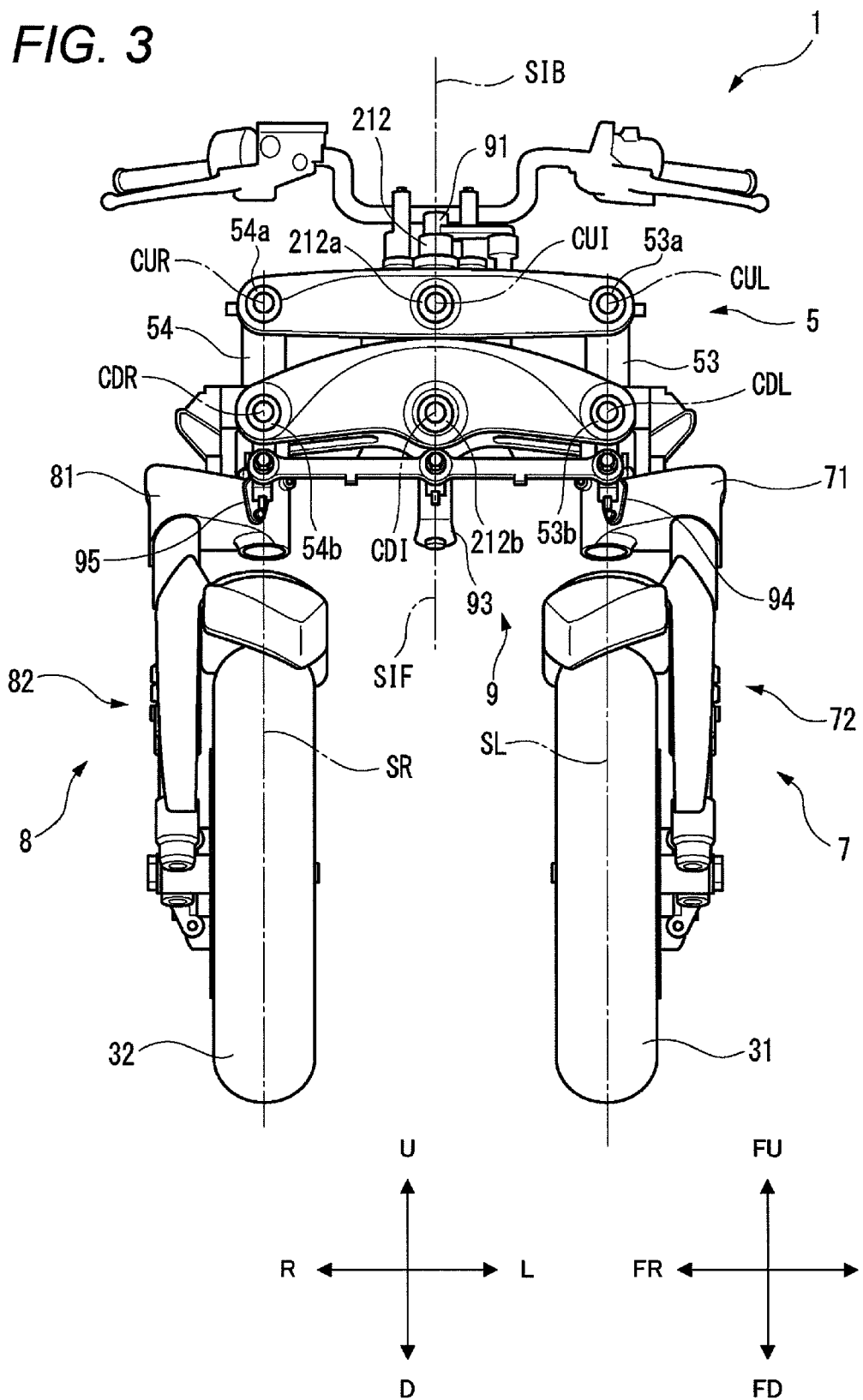
FIG. 3 is a front view showing the front portion of the vehicle of FIG. 1.

FIG. 3 is a front view of the front portion of the vehicle 1 when viewed from the front in the front-rear direction of the body frame 21. In FIG. 3, the body frame 21 is in the upright state. The following description to be made while referring to FIG. 3 is based on the premise that the body frame 21 is in the upright state. In FIG. 3, the front cover 221 is omitted from illustration.

The two front wheels 3 include a left front wheel 31 and a right front wheel 32. The left front wheel 31 is disposed on the left of the head pipe 211 and the link support 212 which define a portion of the body frame 21 in the left-right direction of the body frame 21. The right front wheel 32 is disposed on the right of the head pipe 211 and the link support 212 which define a portion of the body frame 21 in the left-right direction of the body frame 21. The left front wheel 31 and the right front wheel 32 are arranged side by side in the left-right direction of the body frame 21.

In the vehicle 1 according to this preferred embodiment, the linkage 5 preferably uses a four parallel joint link system (also referred to as a parallelogram link).

The linkage 5 is disposed above the left front wheel 31 and the right front wheel 32 in the up-down direction of the body frame 21. The linkage 5 includes an upper cross member 51, a lower cross member 52, a left side member 53 and a right side member 54. The linkage 5 is not interlocked with the turning of the upstream steering shaft 62 about the rear intermediate steering axis SIB which occurs in association with the operation of the handlebar 61. Namely, the linkage 5 does not turn about the rear intermediate steering axis SIB relative to the body frame 21.

The link support 212 includes an upper intermediate connecting portion 212a. An intermediate portion of the upper cross member 51 is supported on the link support 212 via the upper intermediate connecting portion 212a. The upper cross member 51 is able to turn relative to the link support 212 about an upper intermediate connecting axis CUI that passes the upper intermediate connecting portion 212a and extends in the front-rear direction of the body frame 21.

The link support 212 includes a lower intermediate connecting portion 212b. An intermediate portion of the lower cross member 52 is supported on the link support 212 via the lower intermediate connecting portion 212b. The lower cross member 52 is able to turn relative to the link support 212 about a lower intermediate connecting axis CDI that passes the lower intermediate connecting portion 212b and extends in the front-rear direction of the body frame 21.

The left side member 53 includes an upper left connecting portion 53a. A left end portion of the upper cross member 51 is connected to the left side member 53 via the upper left connecting portion 53a. The upper cross member 51 is able to turn relative to the left side member 53 about an upper left connecting axis CUL that passes the upper left connecting 53a and which extends in the front-rear direction of the body frame 21.

The right side member 54 includes an upper right connecting portion 54a. A right end portion of the upper cross member 51 is connected to the right side member 54 via the upper right connecting portion 54a. The upper cross member 51 is able to turn relative to the right side member 54 about an upper right connecting axis CUR that passes the upper right connecting portion 54a and which extends in the front-rear direction of the body frame 21.

The left side member 53 includes a lower left connecting portion 53b. A left end portion of the lower cross member 52 is connected to the left side member 53 via the lower left connecting portion 53b. The lower cross member 52 is able to turn relative to the left side member 53 about a lower left connecting axis CDL that passes the lower left connecting 53b and which extends in the front-rear direction of the body frame 21.

The right side member 54 includes a lower right connecting portion 54b. A right end portion of the lower cross member 52 is connected to the right side member 54 via the lower right connecting portion 54b. The lower cross member 52 is able to turn relative to the right side member 54 about a lower right connecting axis CDR that passes the lower right connecting portion 54*b* and which extends in the front-rear direction of the body frame 21.

Figure 4:
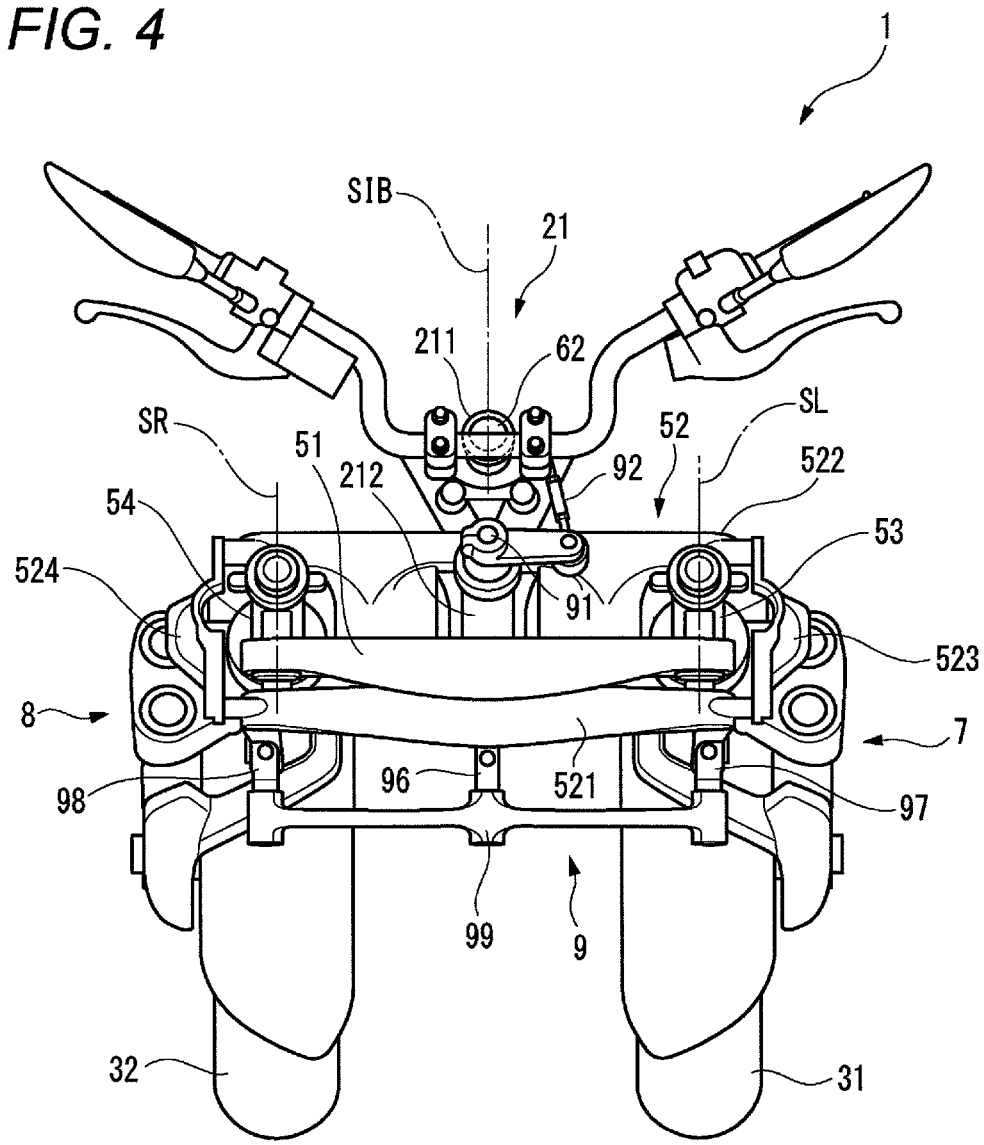
FIG. 4 is a plan view showing the front portion of the vehicle of FIG. 1.
Figure 4:
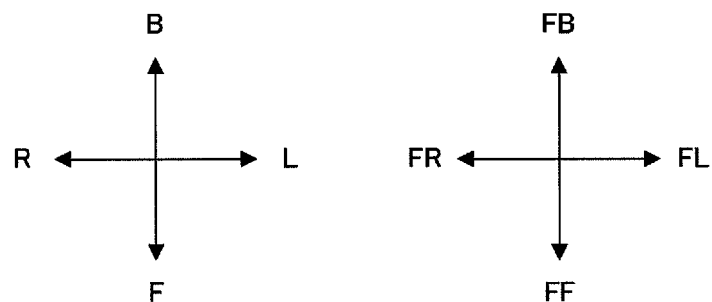

FIG. 4 is a plan view of the front portion of the vehicle 1 when viewed from above in the up-down direction of the body frame 21. In FIG. 4, the body frame 21 is in the upright state. The following description to be made while referring to FIG. 4 is based on the premise that the body frame 21 is in the upright state. In FIG. 4, the front cover 221 is omitted from illustration.

The upper cross member 51 is disposed ahead of the link support 212 in the front-rear direction of the body frame 21. The upper cross member 51 is a plate member that extends in the left-right direction of the body frame 21 without being curved in the front-rear direction of the body frame 21.

As shown in FIGS. 2 and 4, the lower cross member 52 is disposed below the upper cross member 51 in the up-down direction of the body frame 21. The lower cross member 52 includes a front element 521 and a rear element 522. The front element 521 is disposed ahead of the link support 212, the left side member 53 and the right side member 54 in the front-rear direction of the body frame 21. The rear element 522 is disposed behind the link support 212, the left side member 53 and the right side member 54 in the front-rear direction of the body frame 21. The front element 521 and the rear element 522 extend in the left-right direction of the body frame 21 without being curved in the front-rear direction of the body frame 21.

As shown in FIG. 4, the lower cross member 52 includes a left connecting member 523 and a right connecting member 524. The left connecting member 523 connects a left end portion of the front element 521 and a left end portion of the rear element 522 together. The right connecting member 524 connects a right end portion of the front element 521 and a right end portion of the rear element 522.

As shown in FIGS. 3 and 4, the left side member 53 is disposed directly on the left of the link support 212 in the left-right direction of the body frame 21. The left side member 53 is disposed above the left front wheel 31 in the up-down direction of the body frame 21. The left side member 53 extends in a direction in which the link support 212 extends. An upper portion of the left side member 53 is disposed behind a lower portion thereof in the front-rear direction of the body frame 21.

As shown in FIGS. 3 and 4, the right side member 54 is disposed directly on the right of the link support 212 in the left-right direction of the body frame 21. The right side member 54 is disposed above the right front wheel 32 in the up-down direction of the body frame 21. The right side member 54 extends in the direction in which the link support 212 extends. An upper portion of the right side member 54 is disposed behind a lower portion thereof in the front-rear direction of the body frame 21.

The upper cross member 51, the lower cross member 52, the left side member 53 and the right side member 54 are supported on the link support 212 so that the upper cross member 51 and the lower cross member 52 maintain their postures that are parallel to each other and the left side member 53 and the right side member 54 maintain their postures that are parallel to each other.

As shown in FIGS. 2 to 4, the vehicle 1 includes a left suspension 7. The left suspension 7 includes a left bracket 71 and a left shock absorber 72.

The left bracket 71 includes a left turning member, not shown, that is provided at an upper portion thereof. The left turning member is disposed in an interior of the left side member 53 and extends in the same orientation as the direction in which the left side member 53 extends. The left turning member is able to turn about a left steering axis SL relative to the left side member 53. Namely, the left bracket 71 is connected to the left side member 53 so as to turn about the left steering axis SL. The left steering axis SL extends in the direction in which the left side member 53 extends. As shown in FIG. 3, the left steering axis SL extends parallel to the rear intermediate steering axis SIB of the upstream steering shaft 62 in the up-down direction of the body frame 21. As shown in FIG. 4, the left steering axis SL extends parallel to the rear intermediate steering axis SIB of the upstream steering shaft 62 in the up-down direction of the body frame 21.

The left shock absorber 72 is preferably a so-called telescopic shock absorber. The left shock absorber 72 attenuates or absorbs a displacement of the left front wheel 31 towards the linkage 5 in the up-down direction of the body frame 21. As shown in FIG. 2, the left shock absorber 72 includes a left front telescopic element 721, a left rear telescopic element 722, a left upper connecting member 723, a left lower connecting member 714 and a left axle 725.

The left front telescopic element 721 includes a left front outer tube 721*a* and a left front inner tube 721*b*. An outer diameter of the left front outer tube 721*a* is greater than an outer diameter of the left front inner tube 721*b*. The left front outer tube 721*a* is supported by the left bracket 71. The left front inner tube 721*b* is connected to the left front outer tube 721*a* so as to slide along a left telescopic axis EL.

The left rear telescopic element 722 includes a left rear outer tube 722*a* and a left rear inner tube 722*b*. An outer diameter of the left rear outer tube 722*a* is greater than an outer diameter of the left rear inner tube 722*b*. The left rear outer tube 722*a* is disposed directly behind the left front outer tube 721*a* in the front-rear direction of the body frame 21. The left rear outer tube 722*a* is supported by the left bracket 71. The left rear inner tube 722*b* is disposed directly behind the left front inner tube 721*b* in the front-rear direction of the body frame 21. The left rear inner tube 722*b* is connected to the left rear outer tube 722*a* so as to be slidable within the left rear inner tube 722*b* along the left telescopic axis EL.

The left upper connecting member 723 connects the left front outer tube 721*a* and the left rear outer tube 722*a* together.

The left lower connecting member 724 connects the left front inner tube 721*b* and the left rear inner tube 722*b* together.

One end (a left end) of the left axle 725 is supported on the left front inner tube 721*b* and the left rear inner tube 722*b* via the left lower connecting member 724. The other end (a right end) of the left axle 725 supports the left front wheel 31.

The left shock absorber 72 attenuates or absorbs a displacement of the left front wheel 31 towards the linkage 5 in the up-down direction of the body frame 21. In particular, the left rear telescopic element 722 is provided with a well-known shock absorber (not shown) that defines a left shock absorber. The left front telescopic element 721, the left upper connecting member 723 and the left lower connecting member 724 define a left turn restrictor and restrict the relative turning between the left rear outer tube 722*a* and the left rear inner tube 722*b*.

As shown in FIGS. 2 to 4, the vehicle 1 includes a right suspension 8. The right suspension 8 includes a right bracket 81 and a right shock absorber 82. The configuration of the right shock absorber 8 is symmetrical with the left suspension 7 relative to the front-rear direction of the body frame 21. Thus, the right suspension 8 is not illustrated separately, and only reference numerals for the right suspension 8 will be shown in FIG. 2.

The right bracket 81 includes a right turning member, not shown, at an upper portion thereof. The right turning member is disposed in an interior of the right side member 54 and extends in the same orientation as the direction in which the right side member 54 extends. The right turning member is able to turn about a right steering axis SR relative to the right side member 54. Namely, the right bracket 81 is connected to the right side member 54 so as to turn about the right steering axis SR. The right steering axis SR extends in the direction in which the right side member 54 extends. As shown in FIG. 3, the right steering axis SR extends parallel to the rear intermediate steering axis SIB of the upstream steering shaft 62 in the up-down direction of the body frame 21. As shown in FIG. 4, the right steering axis SR extends parallel to the rear intermediate steering axis SIB of the upstream steering shaft 62 in the up-down direction of the body frame 21.

The right shock absorber 82 is preferably a so-called telescopic shock absorber. As shown in FIG. 2, the right shock absorber 82 includes a right front telescopic element 821, a right rear telescopic element 822, a right upper connecting member 823, a right lower connecting member 824 and a right axle 825.

The right front telescopic element 821 includes a right front outer tube 821a and a right front inner tube 821b. An outer diameter of the right front outer tube 821a is greater than an outer diameter of the right front inner tube 821b. The right front outer tube 821a is supported by the right bracket 81. The right front inner tube 821b is connected to the right front outer tube 821a so as to be slidable within the right front outer tube 821a along a right telescopic axis ER.

The right rear telescopic element 822 includes a right rear outer tube 822a and a right rear inner tube 822b. An outer diameter of the right rear outer tube 822a is greater than an outer diameter of the right rear inner tube 822b. The right rear outer tube 822a is disposed directly behind the right front outer tube 821a in the front-rear direction of the body frame 21. The right rear outer tube 822a is supported by the right bracket 81. The right rear inner tube 822b is disposed directly behind the right front inner tube 821b in the front-rear direction of the body frame 21. The right rear inner tube 822b is connected to the right rear outer tube 822a so as to slide along the right telescopic axis ER.

The right upper connecting member 823 connects the right front outer tube 821a and the right rear outer tube 822a together.

The right lower connecting member 824 connects the right front inner tube 821b and the right rear inner tube 822b together.

One end (a right end) of the right axle 825 is supported on the right front inner tube 821b and the right rear inner tube 822b via the right lower connecting member 824. The other end (a left end) of the right axle 825 supports the right front wheel 32.

The right shock absorber 82 attenuates or absorbs a displacement of the right front wheel 32 towards the linkage 5 in the up-down direction of the body frame 21. In particular, the right rear telescopic element 822 is provided with a well-known shock absorber (not shown) that defines a right shock absorber. The right front telescopic element 821, the right upper connecting member 823 and the right lower connecting member 824 define a right turn restrictor and restrict the relative turning between the right rear outer tube 822a and the right rear inner tube 822b.

As shown in FIGS. 2 to 4, the vehicle 1 includes a steering force transmission 9. The steering force transmission 9 includes a downstream steering shaft 91, a connecting device 92, an intermediate transmission plate 93, a left transmission plate 94, a right transmission plate 95, an intermediate joint 96, a left joint 97, a right joint 98 and a tie-rod 99.

The downstream steering shaft 91 is supported on the link support 212 so as to turn about a front intermediate steering axis SIF. The front intermediate steering axis SIF extends parallel to the rear intermediate steering axis SIB about which the upstream steering shaft 62 turns.

The connecting device 92 connects the upstream steering shaft 62 and the downstream steering shaft 91 together. The connecting device 92 is displaced in association with the turning of the upstream steering shaft 62. The downstream steering shaft 91 is able to turn in association with the displacement of the connecting device 92. Namely, the connecting device 92 transmits a turning operation of the upstream steering shaft 62 to the downstream steering shaft 91.

The intermediate transmission plate 93 is connected to a lower portion of the downstream steering shaft 91. The intermediate transmission plate 93 is not able to turn relative to the downstream steering shaft 91. The intermediate transmission plate 93 is able to turn about the front intermediate steering axis SIF relative to the link support 212.

The left transmission plate 94 is disposed directly on the left of the intermediate transmission plate 93 in the left-right direction of the body frame 21. The left transmission plate 94 is connected to a lower portion of the left bracket 71. The left transmission plate 94 is not able to turn relative to the left bracket 71. The left transmission plate 94 is able to turn about the left steering axis SL relative to the left side member 53.

The right transmission plate 95 is disposed directly on the right of the intermediate transmission plate 93 in the left-right direction of the body frame 21. The right transmission plate 95 is connected to a lower portion of the right bracket 81. The right transmission plate 95 is not able to turn relative to the right bracket 81. The right transmission plate 95 is able to turn about the right steering axis SR relative to the right side member 54.

As shown in FIG. 4, the intermediate joint 96 is connected to a front portion of the intermediate transmission plate 93 via a shaft portion that extends in the up-down direction of the body frame 21. The intermediate transmission plate 93 and the intermediate joint 96 are able to turn relative to each other about this shaft portion.

The left joint 97 is disposed on the left of the intermediate joint 96 in the left-right direction of the body frame 21. The left joint 97 is connected to a front portion of the left transmission plate 94 via a shaft portion that extends in the up-down direction of the body frame 21. The left transmission plate 94 and the left joint 97 are able to turn relative to each other about this shaft portion.

The right joint 98 is disposed on the right of the intermediate joint 96 in the left-right direction of the body frame 21. The right joint 98 is connected to a front portion of the right transmission plate 95 via a shaft portion that extends in the up-down direction of the body frame. The right transmission plate 95 and the right joint 98 are able to turn relative to each other about this shaft portion.

A shaft portion that extends in the front-rear direction of the body frame 21 is provided at a front portion of the intermediate joint 96. A shaft portion that extends in the front-rear direction of the body frame 21 is provided at a front portion of the left joint 97. A shaft portion that extends in the front-rear direction of the body frame 21 is provided at a front portion of the right joint 98.

The tie-rod 99 extends in the left-right direction of the body frame 21. The tie-rod 99 is connected to the intermediate joint 96, the left joint 97 and the right joint 98 via those shaft portions. The tie-rod 99 and the intermediate joint 96 are able to turn relative to each other about the shaft portion that is provided at the front portion of the intermediate joint 96. The tie-rod 99 and the left joint 97 are able to turn relative to each other about the shaft portion that is provided at the front portion of the left joint 97. The tie-rod 99 and the right joint 98 are able to turn relative to each other about the shaft portion that is provided at the front portion of the right joint 98.

The left transmission plate 94 is connected to the intermediate transmission plate 93 via the left joint 97, the tie-rod 99, and the intermediate joint 96. The right transmission plate 95 is connected to the intermediate transmission plate 93 via the right joint 98, the tie-rod 99 and the intermediate joint 96. The left transmission plate 94 and the right transmission plate 95 are connected to each other via the left joint 97, the tie-rod 99 and the right joint 98. In other words, the tie-rod 99 connects the intermediate transmission plate 93 to the left transmission plate 94 and the right transmission plate 95.

Figure 5:
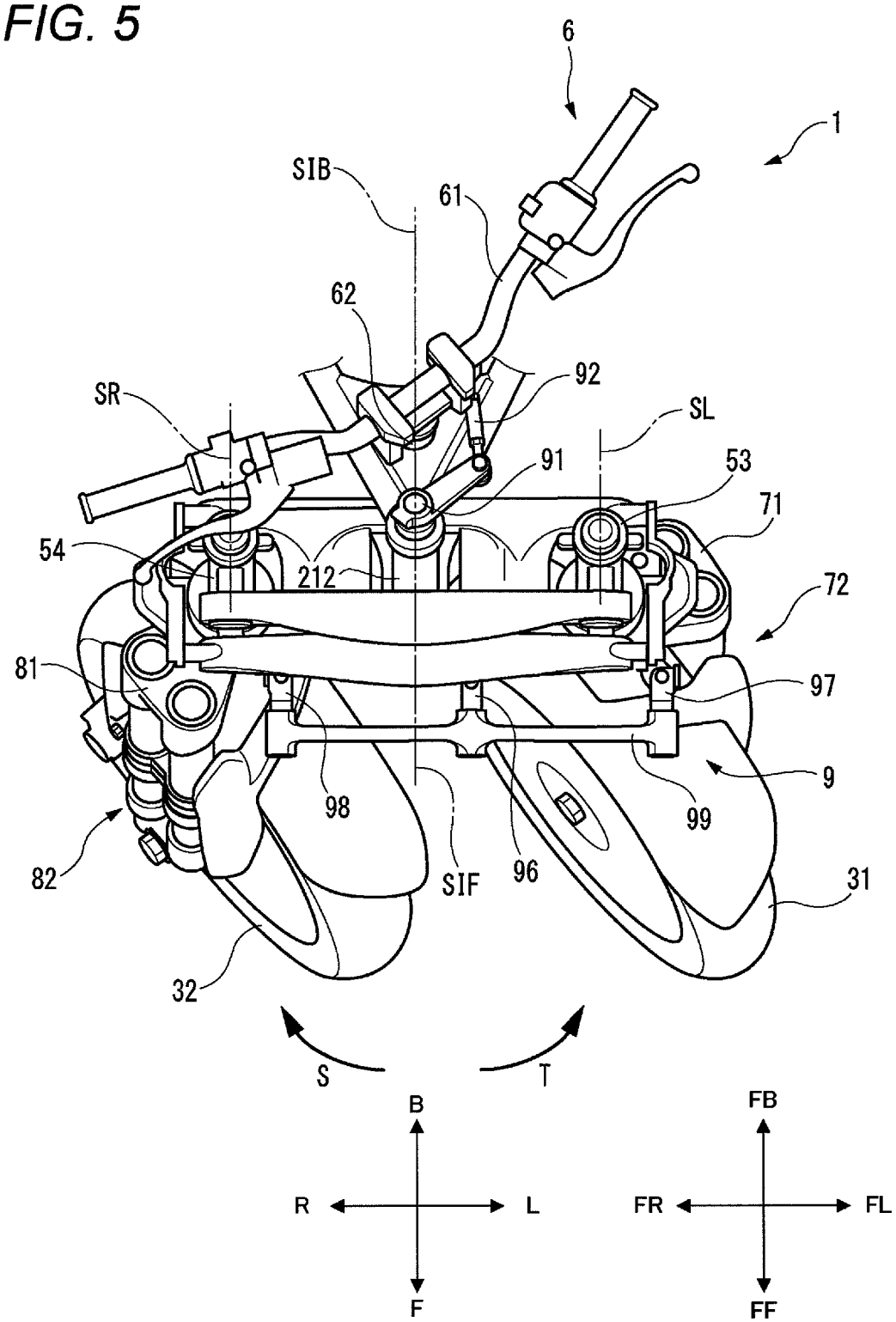
FIG. 5 is a plan view showing the front portion of the vehicle of FIG. 1 when steering is performed.

Next, referring to FIGS. 4 and 5, a steering operation of the vehicle 1 will be described. FIG. 5 is a plan view of the front portion of the vehicle 1 that is in such a state that the left front wheel 31 and the right front wheel 32 are turned to the left, as viewed from above in the up-down direction of the body frame 21. In FIG. 5, the front cover 221 is omitted from illustration.

When the rider operates the handlebar 61, the upstream steering shaft 62 is turned about the rear intermediate steering axis SIB relative to the head pipe 211. The turning operation of the upstream steering shaft 62 is transmitted to the downstream steering shaft 91 via the connecting device 92. When the turning of the upstream steering shaft 62 is transmitted to the downstream steering shaft 91, the downstream steering shaft 91 is turned relative to the link support 212 about the front intermediate steering axis SIF. In the case of the downstream steering shaft 91 being turned to the left as shown in FIG. 5, the steering shaft 91 turns in a direction indicated by an arrow T. In association with the turning of the downstream steering shaft 91, the intermediate transmission plate 93 turns in the direction indicated by the arrow T about the front intermediate steering axis SIF relative to the link support 212.

In association with the turning of the intermediate transmission plate 93 in the direction indicated by the arrow T, the intermediate joint 96 turns relative to the intermediate transmission plate 93 in a direction indicated by an arrow S. This causes the tie-rod 99 to move to the left in the left-right direction of the body frame 21 and to the rear in the front-rear direction of the body frame 21 while maintaining its posture.

In association with the movement of the tie-rod 99, the left joint 97 and the right joint 98 turn in the direction indicated by the arrow S relative to the left transmission plate 94 and the right transmission plate 95, respectively. This turns the left transmission plate 94 and the right transmission plate 95 in the direction indicated by the arrow T while allowing the tie-rod 99 to maintain its posture.

When the left transmission plate 94 turns in the direction indicated by the arrow T, the left bracket 71, which is not able to turn relative to the left transmission plate 94, is turned in the direction indicated by the arrow T about the left steering axis SL relative to the left side member 53.

When the right transmission plate 95 turns in the direction indicated by the arrow T, the right bracket 81, which is not able to turn relative to the right transmission plate 95, is turned in the direction indicated by the arrow T about the right steering axis SR relative to the right side member 54.

When the left bracket 71 is turned in the direction indicated by the arrow T, the left shock absorber 72, which is supported on the left bracket 71, is turned in the direction indicated by the arrow T about the left steering axis SL relative to the left side member 53. When the left shock absorber 72 is turned in the direction indicated by the arrow T, the left front wheel 31, which is supported on the left shock absorber 72, is turned in the direction indicated by the arrow T about the left steering axis SL relative to the left side member 53.

When the right bracket 81 is turned in the direction indicated by the arrow T, the right shock absorber 82, which is supported on the right bracket 81, is turned in the direction indicated by the arrow T about the right steering axis SR relative to the right side member 54. When the right shock absorber 82 is turned in the direction indicated by the arrow T, the right front wheel 32, which is supported on the right shock absorber 82, is turned in the direction indicated by the arrow T about the right steering axis SR relative to the right side member 54.

When the rider operates the handlebar 61 so as to turn to the right, the elements described above turn in opposite directions to the directions in which they turn when the vehicle turns to the left. Since the elements merely move the other way around in relation to the left-right direction, detailed description thereof will be omitted here.

Thus, as has been described above, the steering member 6 transmits the steering force to the left front wheel 31 and the right front wheel 32 in response to the operation of the handlebar 61 by the rider. The left front wheel 31 and the right front wheel 32 turn about the left steering axis SL and the right steering axis SR, respectively, in the direction corresponding to the direction in which the handlebar 61 is operated by the rider.

Figure 6:
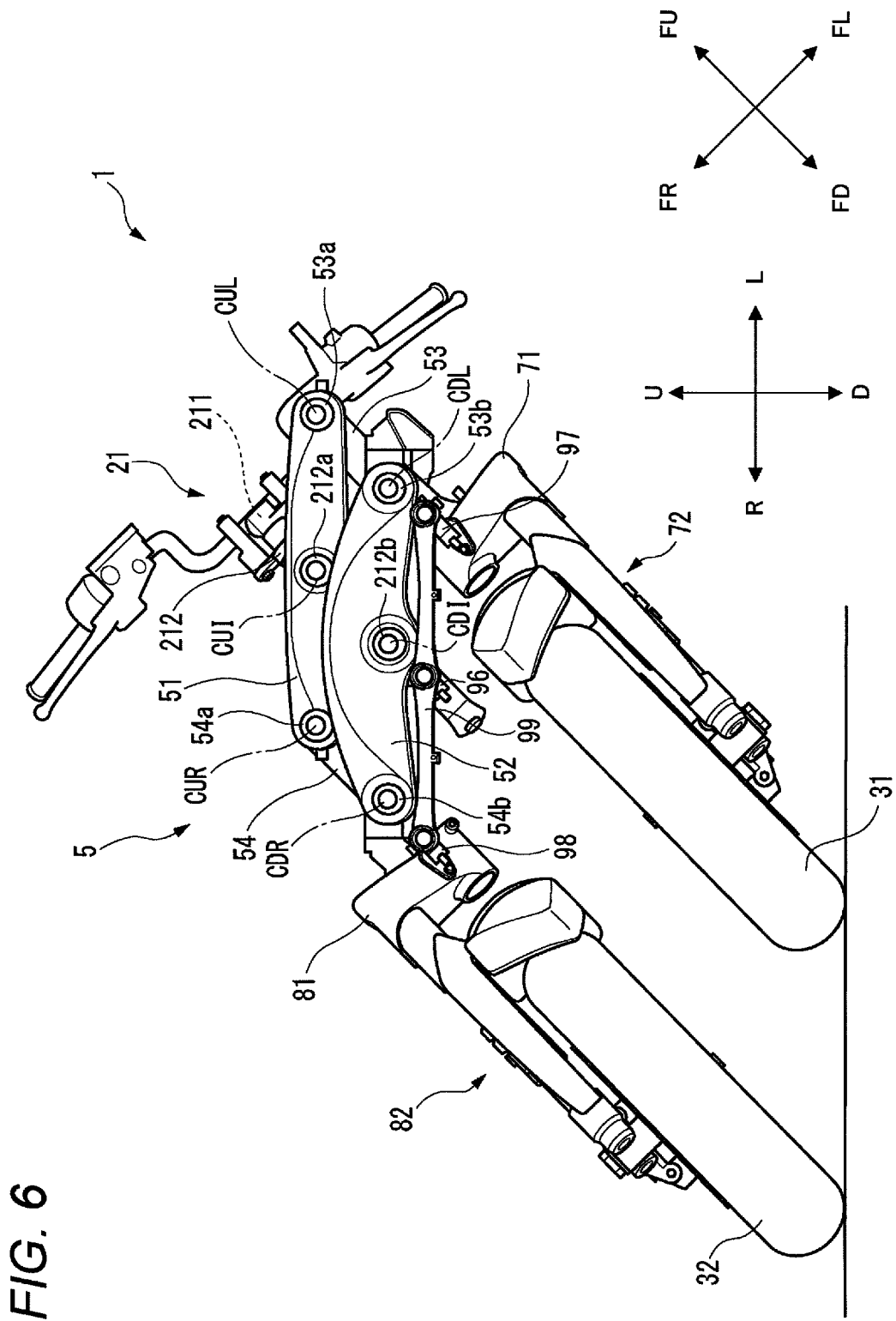
FIG. 6 is a front view showing the front portion of the vehicle of FIG. 1 when leaning is performed.

Next, referring to FIGS. 3 and 6, a leaning operation of the vehicle 1 will be described. FIG. 6 is a front view of the front portion of the vehicle 1, when viewed from the front in the front-rear direction of the body frame 21, with the body frame 21 caused to lean to the left of the vehicle 1. In FIG. 6, the front cover 221 is omitted from illustration.

As shown in FIG. 3, when looking at the vehicle 1 from the front of the body frame 21 that is standing upright, the linkage 5 exhibits a rectangular shape. As shown in FIG. 6, when looking at the vehicle 1 from the front of the body frame 21 that is leaning, the linkage 5 exhibits a parallelogram shape. The operation of the linkage 5 is interlocked with the leaning of the body frame 21 in the left-right direction. The operation of the linkage 5 means that the shape of the linkage 5 changes as a result of the upper cross member 51 and the lower cross member 52 turning relative to the link support 212 about the upper intermediate connecting axis CUI and the lower intermediate connecting axis CDI, respectively, and the upper cross member 51, the lower cross member 52, the left side member 53 and the right side member 54 turning relatively about the upper left connecting axis CUL, the upper right connecting axis CUR, the lower left connecting axis CDL and the lower right connecting axis CDR, respectively.

For example, as shown in FIG. 6, when the rider causes the vehicle 1 to lean to the left, the head pipe 211 and the link support 212 lean to the left from the vertical direction. When the head pipe 211 and the link support 212 lean, the upper cross member 51 turns counterclockwise about the upper intermediate connecting axis CUI that passes the upper intermediate connecting portion 212a relative to the link support 212 when viewed from the front of the vehicle 1. Similarly, the lower cross member 52 is turned counterclockwise about the lower intermediate connecting axis CDI that passes the lower intermediate connecting portion 212b relative to the head pipe 211 when viewed from the front of the vehicle 1. This causes the upper cross member 51 to move to the left in the left-right direction of the body frame 21 relative to the lower cross member 52.

By moving in the way described above, the upper cross member 51 turns counterclockwise about the upper left connecting axis CUL that passes the upper left connecting portion 53a and the upper right connecting axis CUR that passes the upper right connecting portion 54a relative to the left side member 53 and the right side member 54, respectively when viewed from the front of the vehicle 1. Similarly, the lower cross member 52 turns counterclockwise about the lower left connecting axis CDL that passes the lower left connecting portion 53b and the lower right connecting axis CDR that passes the lower right connecting portion 54b relative to the left side member 53 and the right side member 54, respectively, when viewed from the front of the vehicle 1. By moving in the way described above, the left side member 53 and the right side member 54 lean to the left of the vehicle 1 from the vertical direction while maintaining postures that are parallel to the head pipe 211 and the link support 212.

As this occurs, the lower cross member 52 moves to the left in the left-right direction of the body frame 21 relative to the tie-rod 99. As a result of the lower cross member 52 moving in the way described above, the shaft portions that are provided at the respective front portions of the intermediate joint 96, the left joint 97 and the right joint 98 turn relative to the tie-rod 99. This allows the tie-rod 99 to maintain a posture that is parallel to the upper cross member 51 and the lower cross member 52.

As the left side member 53 leans to the left of the vehicle 1, the left bracket 71 that is supported on the left side member 53 via the left turning member leans to the left of the vehicle 1. In association with the leftward leaning of the left bracket 71, the left shock absorber 72 that is supported on the left bracket 71 also leans to the left of the vehicle 1. As a result of the left shock absorber 72 leaning in the way described above, the left front wheel 31 that is supported on the left shock absorber 72 leans to the left of the vehicle 1 while maintaining a posture that is parallel to the head pipe 211 and the link support 212.

As the right side member 54 leans to the left of the vehicle 1, the right bracket 81 that is supported on the right side member 54 via the right turning member leans to the left of the vehicle 1. In association with the leftward leaning of the right bracket 81, the right shock absorber 82 that is supported on the right bracket 81 also leans to the left of the vehicle 1. As a result of the right shock absorber 82 leaning in the way described above, the right front wheel 32 that is supported on the right shock absorber 82 leans to the left of the vehicle 1 while maintaining a posture that is parallel to the head pipe 211 and the link support 212.

The description of the leaning operations of the left front wheel 31 and the right front wheel 32 is made based on the vertical direction. However, when the vehicle 1 leans (when the linkage 5 is operated), the up-down direction of the body frame 21 is not coincident with the vertical direction. In the event of this being described based on the up-down direction of the body frame 21, when the linkage 5 is operated, the left front wheel 31 and the right front wheel 32 change their relative positions in the up-down direction of the body frame 21. In other words, the linkage 5 changes the relative positions of the left front wheel 31 and the right front wheel 32 in the up-down direction of the body frame 21 to cause the body frame 21 to lean to the left or right of the vehicle 1 from the vertical direction.

When the rider causes the vehicle 1 to lean to the right, the elements lean to the right. Since the elements merely move the other way around in relation to the left-right direction, detailed description thereof will be omitted here.

Figure 7:
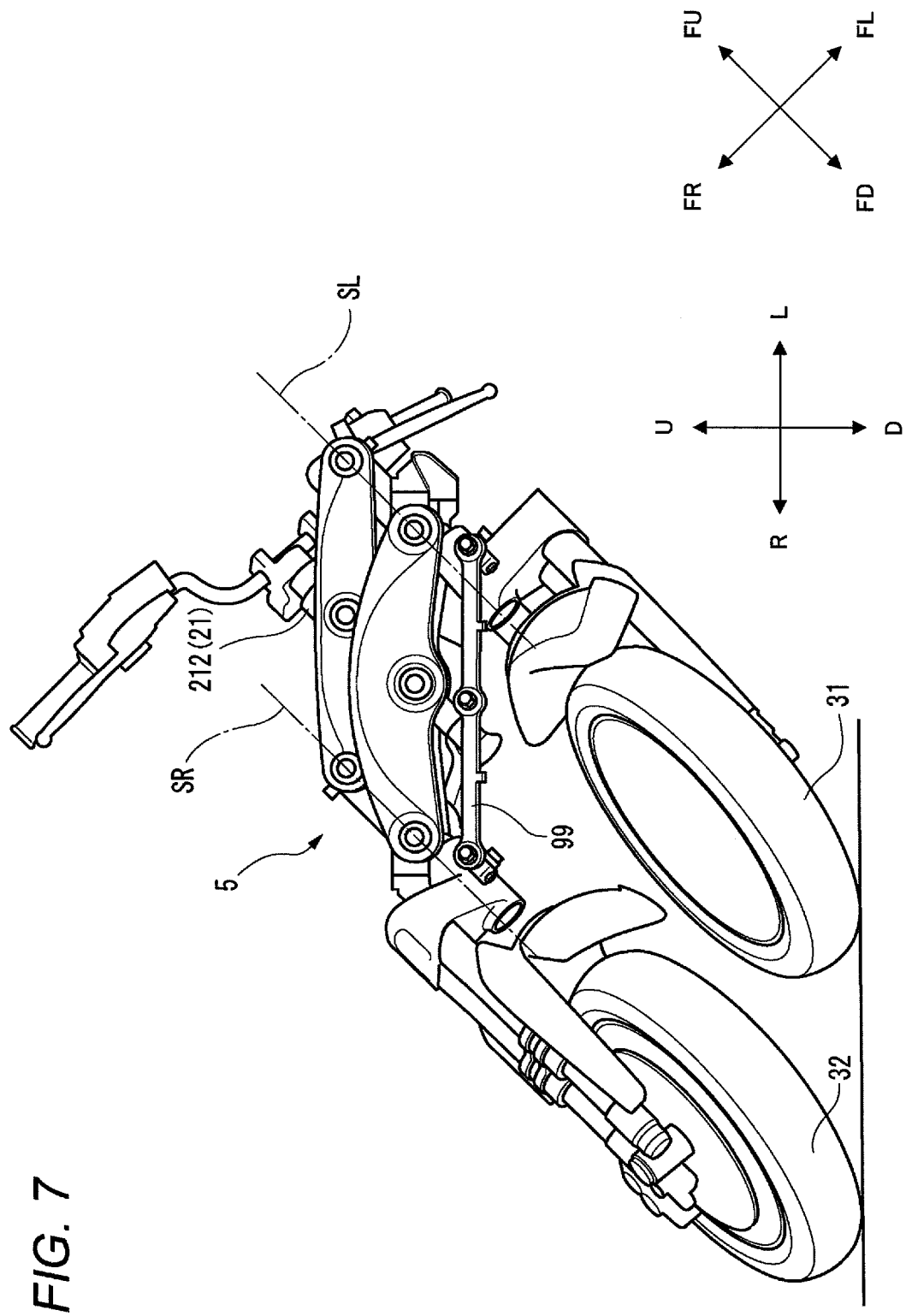
FIG. 7 is a front view showing the front portion of the vehicle of FIG. 1 when steering and leaning are performed.

FIG. 7 is a front view of the front portion of the vehicle 1, when viewed from the front in the front-rear direction of the body frame 21, in such a state that the vehicle 1 is caused to lean and turned. FIG. 7 shows a state in which the vehicle 1 is steered or turned to the left while being caused to lean to the left. In FIG. 7, the front cover 221 is omitted from illustration.

When a steering operation is performed, the left front wheel 31 is turned counterclockwise about the left steering axis SL, while the right front wheel 32 is turned counterclockwise about the right steering axis SR. When a leaning operation is performed, the left front wheel 31 and the right front wheel 32 lean to the left of the vehicle 1 together with the body frame 21. Namely, in this state, the linkage 5 exhibits the parallelogram shape. The tie-rod 99 moves to the left in the left-right direction of the body frame 21 and to the rear in the front-rear direction of the body frame 21 from the position where the body frame 21 is in the upright state.

Figure 8A:
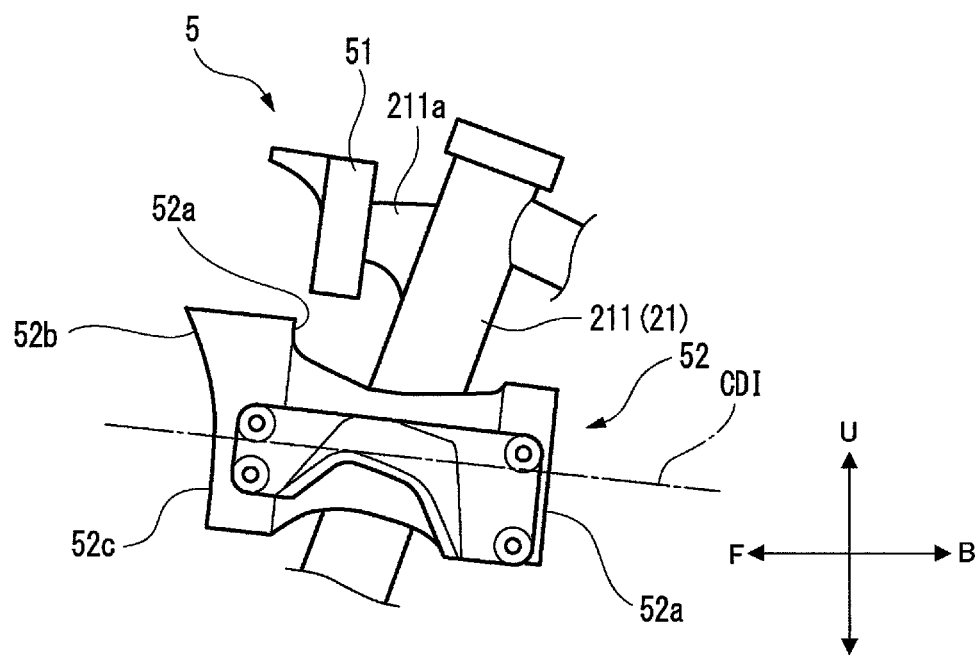
FIGS. 8A and 8B are enlarged views of a linkage when the vehicle is standing upright.
Figure 8B:
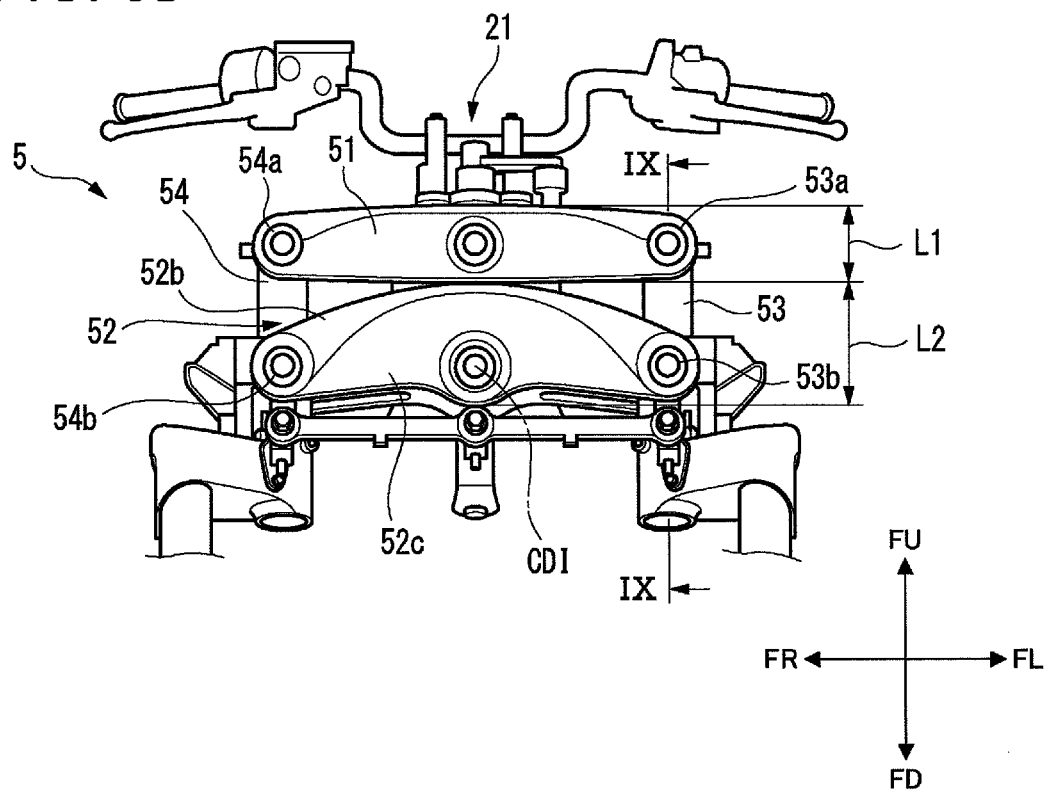
Figure 9A:
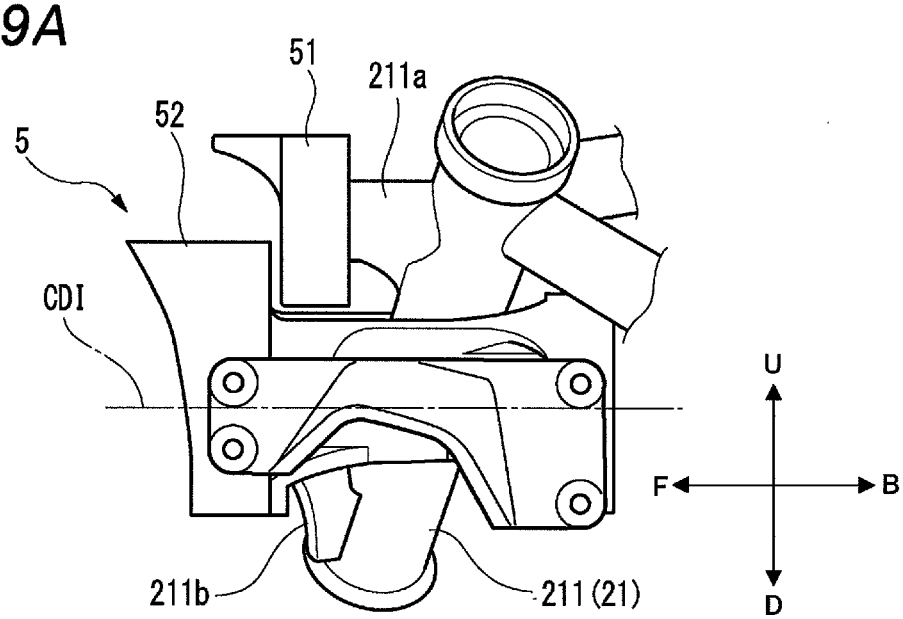
FIGS. 9A and 9B are enlarged views of the linkage when the vehicle is caused to lean.
Figure 9B:
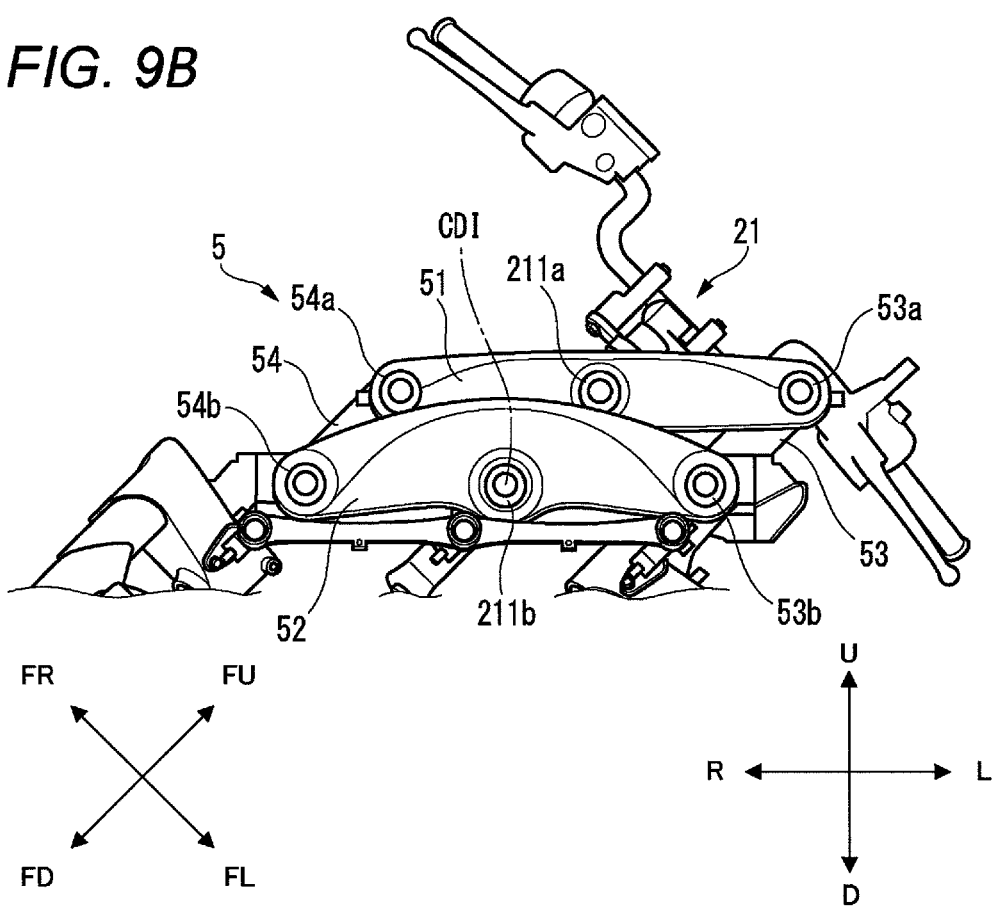

FIG. 8A is an enlarged left side view of the linkage 5 when the vehicle 1 is standing upright. In FIG. 8A, the illustration of the left side member 53 is omitted as a matter of convenience. FIG. 8B is an enlarged front view of the linkage 5 in the same state. FIG. 9A is a left side view of the linkage 5, as viewed from the left in the left-right direction of the vehicle 1, in such a state that the vehicle 1 is caused to lean to the left with the maximum angle. In FIG. 9A, the illustration of the left side member 53 is also omitted as a matter of convenience. FIG. 9B is an enlarged front view of the linkage 5 in the same state.

As described above, there is a desire to increase the leaning angle (the so-called banking angle) of the body frame 21 toward the left or right of the vehicle 1. The inventor of preferred embodiments of the present invention studied the movable range of the upper cross member 51 and the movable range of the lower cross member 52 when the body frame 21 is caused to lean in the left-right direction of the vehicle 1. As a result, the inventor discovered that, when the movable range of the upper cross member 51 is directly behind the movable range of the lower cross member 52, the upper cross member 51 is not brought into contact with the lower cross member 52 when the body frame 21 is caused to lean. Specifically, as shown in FIGS. 8A, 8B, 9A and 9B, the movable ranges of the upper cross member 51 and the lower cross member 52 are set so that a portion of the upper cross member 51 and a portion of the lower cross member 52 overlap each other without coming into contact with each other when the vehicle 1 is viewed from the front in a direction along the lower intermediate connecting axis CDI in at least a range of leaning angles of the body frame 21 from zero to the maximum angle.

By using this configuration, since the upper cross member 51 and the lower cross member 52 are not brought into contact with each other according to the leaning angle of the body frame 21, a large leaning angle of the body frame 21 is ensured while reducing the distance between the upper intermediate connecting axis CUI and the lower intermediate connecting axis CDI as much as possible. Consequently, it is possible to significantly reduce or minimize the enlargement in the size of the linkage 5 in the up-down direction of the body frame 21 remarkably.

In the vehicle 1 according to the present preferred embodiment, as shown in FIG. 2, the linkage 5 is disposed behind the front end of the left front wheel 31 and the front end of the right front wheel 32. In other words, the front wheels 3 are partially located ahead of the linkage 5. Thus, by arranging for the movable range of the upper cross member 51 and the movable range of the lower cross member 52 to overlap each other partially when viewed from the front, even though the dimension in the front-rear direction of the body frame 21 is increased, the influence of the increase on the enlargement in the size of the vehicle 1 in the direction concerned is relatively small.

Consequently, it is possible to ensure a relatively large banking angle while significantly reducing or minimizing the enlargement in the size of the vehicle 1 that includes the leanable body frame 21 and the two front wheels 3.

In particular, in the vehicle 1 according to the present preferred embodiment, as shown in FIG. 9B, a portion of the upper cross member 51 and a portion of the lower cross member 52 overlap when the vehicle 1 is viewed from the front in the direction along the lower intermediate connecting axis CDI in a state that the body frame 21 is caused to lean to the left with a maximum angle. As described above, this is true in such a state that the body frame 21 is caused to lean to the right with a maximum angle.

By setting the overlapping condition of the movable range of the upper cross member 51 and the lower cross member 52 in the front-rear direction to that described above, it is possible to ensure a larger banking angle while further significantly reducing or minimizing the enlargement in the size of the linkage 5. Consequently, it is possible to ensure a relatively large banking angle more easily while further significantly reducing or minimizing the enlargement in the size of the vehicle 1 that includes the leanable body frame 21 and the two front wheels 3.

In the vehicle 1 according to the present preferred embodiment, as shown in FIG. 6, a portion of the lower cross member 52 which is located directly above the lower intermediate connecting axis CDI overlaps the upper cross member 51 when the vehicle 1 is viewed from the front in the direction along the lower intermediate connecting axis CDI in a state that the body frame 21 is caused to lean to the left with the maximum angle.

By setting the overlapping condition of the movable range of the upper cross member 51 and the lower cross member 52 in the front-rear direction to that described above, it is possible to increase the dimension of the lower cross member 52 in the up-down direction of the body frame 21. By using this configuration, the rigidity of the lower cross member 52, in particular, the rigidity of the portion of the lower cross member 52 that is adjacent the lower intermediate connecting axis CDI is enhanced. Consequently, it is possible not only to ensure a relatively large banking angle while significantly reducing or minimizing the enlargement in the size of the vehicle 1 that includes the leanable body frame 21 and the two front wheels 3 but also to improve the stability in the operation of the linkage 5.

In the vehicle 1 according to the present preferred embodiment, as shown in FIG. 6, a portion of a front surface of the upper cross member 51 faces a portion of a rear surface 52a of the lower cross member 52 when a portion of the upper cross member 51 overlaps a portion of the lower cross member 52.

As shown in FIG. 8A, in this description, the rear surface 52a of the lower cross member 52 includes not only a rear end surface of the lower cross member 52 (that is, a rear surface of the rear element 522 shown in FIG. 4) but also a surface that is visible when the lower cross member 52 is viewed from the rear in the direction along the lower intermediate connecting axis CDI.

According to this configuration, since the distance between the upper intermediate connecting axis CUI and the lower intermediate connecting axis CDI is further reduced, it is possible to further reduce or minimize the enlargement in the size of the linkage 5 in the up-down direction of the body frame 21. As described above, by disposing the upper cross member 51 and the lower cross member 52 so that a portion of the front surface of the upper cross member 51 face a portion of the rear surface 52a of the lower cross member 52, even though the dimension in the front-rear direction of the body frame 21 is increased, the influence of the increase on the enlargement in the size of the vehicle 1 in the direction concerned is relatively small.

Consequently, it is possible to ensure a relatively large banking angle while further significantly reducing or minimizing the enlargement in the size of the vehicle 1 that includes the leanable body frame 21 and the two front wheels 3.

As shown in FIG. 8B, a front surface of the lower cross member 52 includes a first portion 52b and a second portion 52c. The first portion 52b extends in the left-right direction of the body frame 21 along an upper edge of the lower cross member 52. The first portion 52b corresponds to a portion of the rear surface 52a that a portion of the front surface of the upper cross member 51 faces. The second portion 52c includes a portion that does not correspond to a portion of the rear surface 52a that a portion of the front surface of the upper cross member 51 faces. As shown in FIG. 8A, the first portion 52b is positioned ahead of the second portion 52c in a direction along the lower intermediate connecting axis CDI.

Here, the expression reading "corresponds to a portion of the rear surface 52a" means that the portion of the rear surface 52a passes when the portion of the rear surface 52a is caused to move in parallel to the front in the front-rear direction of the body frame 21. Namely, the first portion 52b refers to a portion of the front surface of the lower cross member 52 where the portion of the rear surface 52a passes when the portion of the rear surface 52a is caused to move in parallel to the front in the front-rear direction of the body frame 21. The second portion 52c refers to a portion of the front surface of the lower cross member 52 where the portion of the rear surface 52a does not pass when the portion of the rear surface 52a is caused to move in parallel to the front in the front-rear direction of the body frame 21.

According to this configuration, a thickness dimension of the first portion 52b of the lower cross member 52 in the direction in which the lower intermediate connecting axis CDI extends is able to be made larger than a thickness of the second portion 52c in the direction concerned. Thus, the rigidity of the lower cross member 52 is enhanced while making efficient use of a portion of the space located behind the lower cross member 52 as a movable range of the upper cross member 51. Consequently, it is possible not only to ensure a relatively large banking angle while significantly reducing or minimizing the enlargement in the size of the vehicle 1 that includes the leanable body frame 21 and the two front wheels 3 but also to improve the rigidity of the linkage 5 against loads.

As shown in FIG. 8B, a maximum width dimension L1 of the upper cross member 51 in the up-down direction of the body frame 21 is smaller than a maximum width dimension L2 of the lower cross member 52 in the up-down direction of the body frame.

By setting the maximum width dimension L1 of the upper cross member 51 in the up-down direction of the body frame 21 in the way described above, it is easy to significantly reduce or minimize the expansion of the movable range of the upper cross member 51. Consequently, it is possible to ensure a relatively large banking angle while further significantly reducing or minimizing the enlargement in the size of the vehicle that includes the leanable body frame 21 and the two front wheels 3.

As described by reference to FIG. 3, the left portion of the upper cross member 51 is connected to the upper portion of the left side member 53 via the upper left connecting portion 53a. The right portion of the upper cross member 51 is connected to the upper portion of the right side member 54 via the upper right connecting portion 54a. The left portion of the lower cross member 52 is connected to the lower portion of the left side member 53 via the lower left connecting portion 53b. The right portion of the lower cross member 52 is connected to the lower portion of the right side member 54 via the lower right connecting portion 54b. The left front wheel 31 is able to turn about the left steering axis SL that extends along the left side member 53. The right front wheel 32 is able to turn about the right steering axis SR that extends along the right side member 54.

Figure 10:
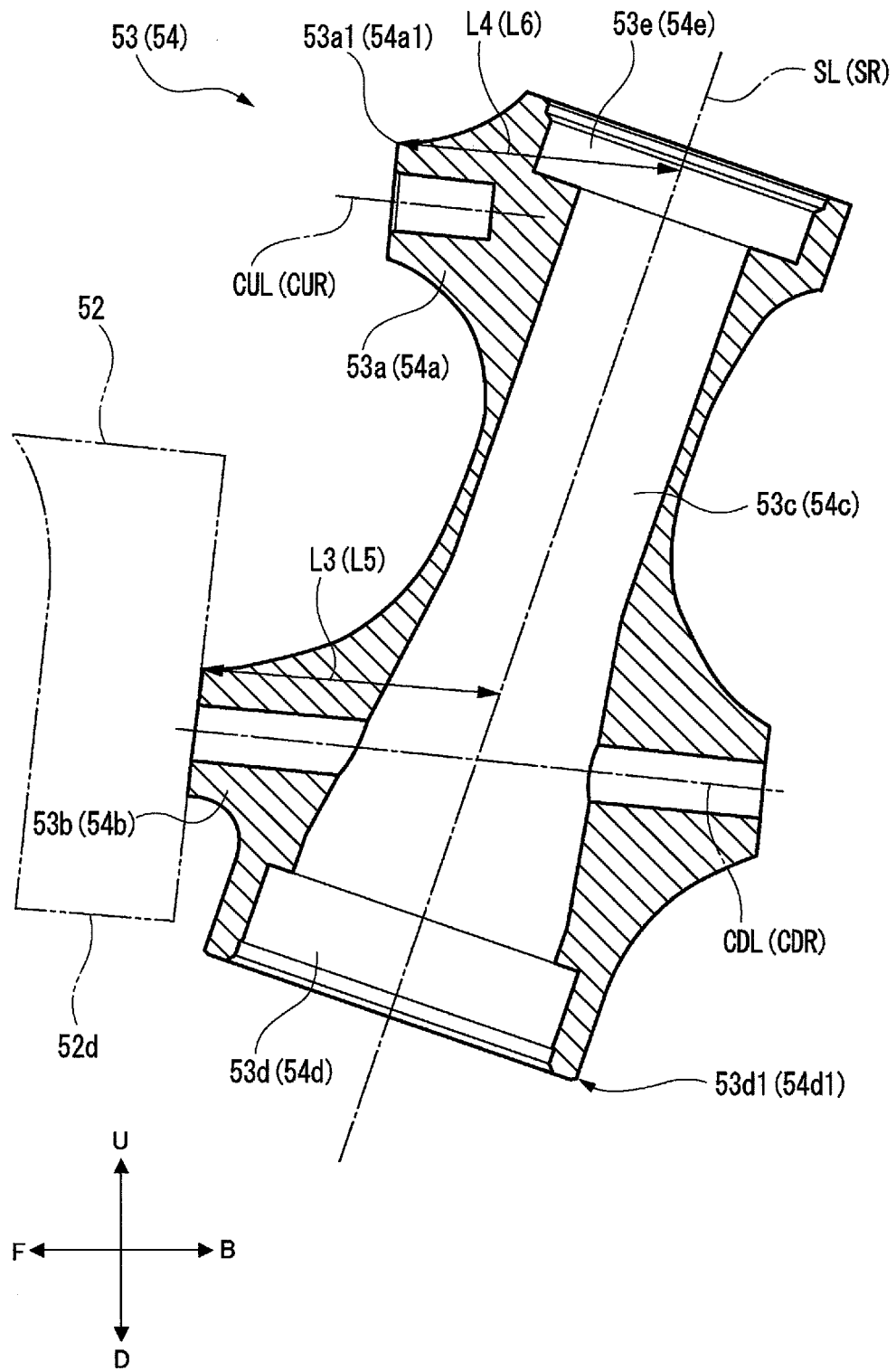
FIG. 10 is a section view of a left side member in the linkage.

FIG. 10 shows a section of the left side member 53 taken along a line IX-IX shown in FIG. 8B (corresponding to the left steering axis SL) and viewed from a direction indicated by arrows (from the left in the left-right direction of the body frame 21). In the vehicle 1 according to this preferred embodiment, a distance L3 between an end portion 53b1 of the lower left connecting portion 53b that is farthest from the left steering axis SL and the left steering axis SL in a direction along the lower left connecting axis CDL is longer than a distance L4 between an end portion 53a1 of the upper left connecting portion 53a that is farthest from the left steering axis SL and the left steering axis SL in a direction along the upper left connecting axis CUL.

Namely, a dimension of the upper portion of the left side member 53 in a direction in which the upper left connecting axis CUL and the lower left connecting axis CDL extend is smaller than a dimension of the lower portion of the left side member 53 in the same direction. Thus, it is possible to significantly reduce or minimize the enlargement in the size of the structure at a left upper portion of the linkage 5. In other words, the dimension of the lower portion of the left side member 53 in the direction in which the upper left connecting axis CUL and the lower left connecting axis CDL extend is larger than the dimension of the upper portion of the left side member 53 in the same direction. Consequently, the rigidity of the linkage 5 against a load that is inputted from the road surface through the left front wheel 31 is improved.

A section of the right side member 54 taken along the right steering axis SR and viewed from the right in the left-right direction of the body frame 21 is symmetrical with the configuration of the left side member 53 shown in FIG. 10 with respect to the front-rear direction. Thus, illustration of the section concerned of the right side member is omitted, and only reference numerals related thereto will be shown in FIG. 10. In the vehicle 1 according to this preferred embodiment, a distance L5 between an end portion 54b1 of the lower right connecting portion 54b that is farthest from the right steering axis SR and the right steering axis SR in a direction along the lower right connecting axis CDR is longer than a distance L6 between an end portion 54a1 of the upper right connecting portion 54a that is farthest from the right steering axis SR and the right steering axis SR in a direction along the upper right connecting axis CUR.

Namely, a dimension of the upper portion of the right side member 54 in a direction in which the upper right connecting axis CUR and the lower right connecting axis CDR extend is smaller than a dimension of the lower portion of the right side member 54 in the same direction. Thus, it is possible to significantly reduce or minimize the enlargement in the size of the structure at a right upper portion of the linkage 5. In other words, the dimension of the lower portion of the right side member 54 in the direction in which the upper right connecting axis CUR and the lower right connecting axis CDR extend is larger than the dimension of the upper portion of the right side member 54 in the same direction. Consequently, the rigidity of the linkage 5 against a load that is inputted from the road surface through the right front wheel 32 is improved.

As a result, it is possible not only to ensure a relatively large banking angle while further significantly reducing or minimizing the enlargement in the size of the vehicle 1 that includes the leanable body frame 21 and the two front wheels 3 but also to improve the rigidity of the linkage 5 against loads.

Figure 11:
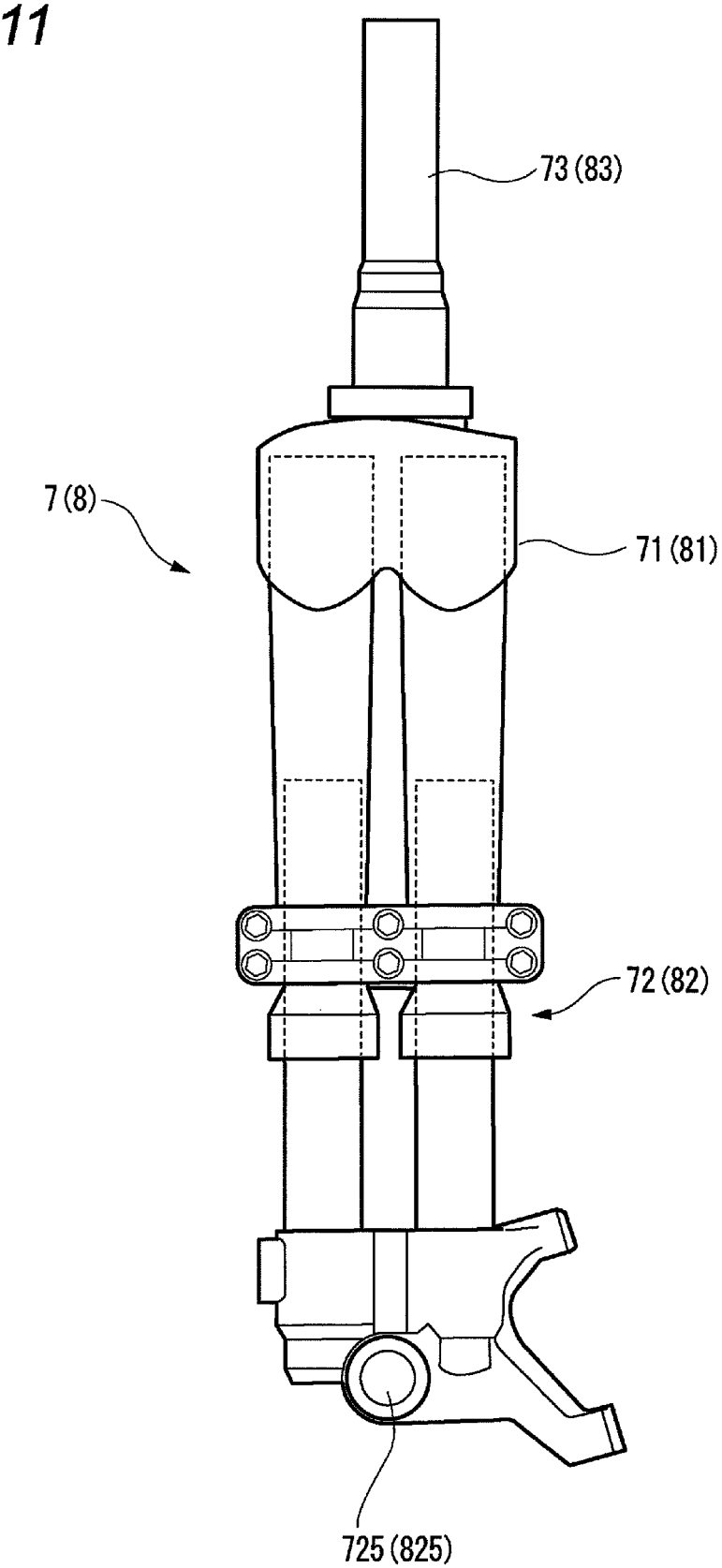
FIG. 11 is a left side view of a left suspension in the vehicle of FIG. 1.

FIG. 11 shows the left suspension 7 as viewed from the left of the vehicle 1. In FIG. 11, the shape of the left bracket 71 is simplified as a matter of convenience. As described before, the left front wheel 31 is supported on the left axle 725 of the left shock absorber 72.

The left suspension 7 includes a left shaft member 73. The left shaft member 73 is provided at an upper portion of the left bracket 71. The left shaft member 73 is inserted into a shaft hole 53c that extends in an interior of the left side member 53 along the left steering axis SL as shown in FIG. 10.

As shown in FIG. 10, the left side member 53 includes a lower left side bearing 53d and an upper left side bearing 53e. The lower left side bearing 53d holds the left shaft member 73 at the lower portion of the left side member 53. The upper left side bearing 53e holds the left shaft member 73 at the upper portion of the left side member 53. By using this configuration, the left suspension 7 is supported on the left side member 53 so as to turn about the left steering axis SL.

In the vehicle 1 according to this preferred embodiment, with the body frame 21 standing upright, a lowermost end portion 53d1 of the lower left side bearing 53d is disposed below a lower end 52d of the lower cross member 52.

According to this configuration, it is easy to ensure a large distance between the lower left side bearing 53d and the upper left side bearing 53e that hold the left suspension 7. By using this configuration, the rigidity of the linkage 5 against vibrations that are inputted from the road surface through the left suspension 7 is improved. In addition, it is easy to ensure a thickness for the left side member 53 that is positioned below the lower end 52d of the lower cross member 52. This fact also contributes to the improvement in the rigidity of the linkage 5 against the vibrations that are inputted from the road surface through the left suspension 7.

The configuration of the right suspension 8 viewed from the right of the vehicle 1 is symmetrical with the configuration of the left suspension 7 shown in FIG. 11 with respect to the front-rear direction. Thus, illustration of the right suspension 8 is omitted, and only reference numerals related thereto will be shown in FIG. 11. In FIG. 11, the shape of the right bracket 81 is simplified as a matter of convenience. As described above, the right front wheel 32 is supported on the right axle 825 of the right shock absorber 82.

The right suspension 8 includes a right shaft member 83. The right shaft member 83 is provided at an upper portion of the right bracket 81. The right shaft member 83 is inserted into a shaft hole 54c that extends in an interior of the right side member 54 along the right steering axis SR as shown in FIG. 10.

As shown in FIG. 10, the right side member 54 includes a lower right side bearing 54d and an upper right side bearing 54e. The lower right side bearing 54d holds the right shaft member 83 at the lower portion of the right side member 54. The upper right side bearing 54e holds the right shaft member 83 at the upper portion of the right side member 54. By using this configuration, the right suspension 8 is supported on the right side member 54 so as to turn about the right steering axis SR.

In the vehicle 1 according to this preferred embodiment, with the body frame 21 standing upright, a lowermost end portion 54d1 of the lower right side bearing 54d is disposed below the lower end 52d of the lower cross member 52.

According to this configuration, it is easy to ensure a large distance between the lower right side bearing 54d and the upper right side bearing 54e that hold the right suspension 8. By using this configuration, the rigidity of the linkage 5 against vibrations that are inputted from the road surface through the right suspension 8 is improved. In addition, it is easy to ensure a thickness for the right side member 54 that is positioned below the lower end 52d of the lower cross member 52. This fact also contributes to the improvement in the rigidity of the linkage 5 against the vibrations that are inputted from the road surface through the right suspension 8.

As a result, it is possible not only to ensure a relatively large banking angle while significantly reducing or minimizing the enlargement in the size of the vehicle 1 that includes the leanable body frame 21 and the two front wheels 3 but also to improve the rigidity of the linkage 5 against loads.

The preferred embodiments that have been described heretofore are intended to facilitate the understanding of the present invention and are not intended to limit the present invention. Preferred embodiments of the present invention can be modified without departing from the scope thereof and that their equivalents can also be included in the present invention.

In the above preferred embodiments, the vehicle 1 preferably includes a single rear wheel 4. However, the vehicle 1 may include a plurality of rear wheels.

In a preferred embodiment of the present invention, the upper cross member 51 is preferably a single plate member, while the lower cross member 52 includes the front element 521 and the rear element 522. However, a configuration may be used in which the upper cross member 51 also includes a front element and a rear element. A configuration may be used in which at least one of the upper cross member 51 and the lower cross member 52 includes a left plate member that is supported on the link support 212 and the left side member 53 and a right plate member that is supported on the link support 212 and the right side member 54.

In the above preferred embodiments, the handlebar 61 preferably includes a single member that extends in the left-right direction of the body frame. However, a configuration may be used in which the handlebar 61 includes a left handlebar portion operated by the left hand of the rider and a right handlebar portion operated by the right hand of the rider and that are provided as separate members, as long as the steering force to turn the left front wheel 31 and the right front wheel 32 is inputted through the handlebar 61.

In the above preferred embodiments, the steering force transmission 9 preferably includes the intermediate transmission plate 93, the left transmission plate 94, the right transmission plate 95, the intermediate joint 96, the left joint 97, the right joint 98, and the tie-rod 99. However, the intermediate transmission plate 93, the left transmission plate 94, the right transmission plate 95, the intermediate joint 96, the left joint 97, and the right joint 98 may be replaced by appropriate elements such as universal joints as required, as long as the steering force inputted from the handlebar 61 is able to be transmitted to the left suspension 7 and the right suspension 8 by way of the tie-rod 99.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of about ±40 degrees are included therein. When used in this description to depict directions and members, the expression reading "along a certain direction" means that a case where something inclines at an angle falling within the range of about ±40 degrees relative to the certain direction is comprised therein. When used in this description, the expression reading "something extends in a certain direction" means that a case where something extends while being inclined at an angle falling within the range of about ±40 degrees relative to the certain direction is comprised therein.

When used in this description, the expression "so as not to be movable relative to the body frame 21" means that a certain portion or member is caused to lean in the left-right direction of the vehicle 1 together with the body frame 21 when the body frame 21 is caused to lean in the left-right direction of the vehicle 1. When used in this description, the expression "so as not to be movable relative to the body frame 21" may include not only a case where a certain portion or member is directly fixed to the body frame but also a case where the certain portion or member is fixed to a vehicle component (a fuel tank, a bracket, the power unit 24, etc.) which is fixed on the body frame 21. Here the term "fixed" may include a case that a certain portion or member is fixed by way of a damping member or the like.

The present invention can be implemented with many different preferred embodiments. This description should be understood to provide preferred embodiments of the present invention. The preferred embodiments which are at least described or illustrated in this description are so described or illustrated based on the understanding that the preferred embodiments are not intended to limit the present invention.

The present invention includes every preferred embodiment which includes an equivalent element, a modification, a deletion, a combination (for example, a combination of characteristics of various preferred embodiments), an improvement and an alteration which can be recognized by those skilled in the art to which the present invention pertains based on the preferred embodiments disclosed in this description. The limitative matters of claims should be construed broadly based on terms used in the claims and hence should not be limited by the preferred embodiments described in this specification or the prosecution of this patent application. The preferred embodiments of the present invention should be construed as non-exclusive. For example, in this description, the terms "preferable" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the along claims.

What is claimed is:

1. A vehicle comprising:
   a body frame;
   a left front wheel and a right front wheel that are arranged side by side in a left-right direction of the body frame; and
   a linkage disposed above the left front wheel and the right front wheel in an up-down direction of the body frame, disposed behind a front end of the left front wheel and a front end of the right front wheel in a front-rear direction of the body frame, and that changes positions of the left front wheel and the right front wheel relative to the body frame to cause the body frame to lean to the left or to the right; wherein
   the linkage includes an upper cross member, a lower cross member, a left side member, and a right side member;
   the upper cross member is connected to the body frame so as to be able to turn about an upper intermediate connecting axis;
   the lower cross member is connected to the body frame so as to be able to turn about a lower intermediate connecting axis;
   a left portion of the upper cross member is connected to an upper portion of the left side member so as to be able to turn about an upper left connecting axis;
   a right portion of the upper cross member is connected to an upper portion of the right side member so as to be able to turn about an upper right connecting axis;
   a left portion of the lower cross member is connected to a lower portion of the left side member so as to be able to turn about a lower left connecting axis;
   a right portion of the lower cross member is connected to a lower portion of the right side member so as to be able to turn about a lower right connecting axis; and
   a portion of the upper cross member and a portion of the lower cross member at least temporarily overlap each other without coming into contact with each other when the body frame is caused to lean from an upright state to the left or to the right at a maximum angle, as viewed from a front of the vehicle in a direction along the lower intermediate connecting axis.

2. The vehicle according to claim 1, wherein the portion of the upper cross member and the portion of the lower cross member overlap each other when the body frame is caused to lean to the left or to the right of the vehicle at the maximum angle, as viewed from the front of the vehicle in the direction along the lower intermediate connecting axis.

3. The vehicle according to claim 1, wherein a portion of the lower cross member that is positioned directly above the lower intermediate connecting axis overlaps the upper cross member, as viewed from the front of the vehicle in the direction along the lower intermediate connecting axis.

4. The vehicle according to claim 1, wherein a portion of a front surface of the upper cross member faces a portion of a rear surface of the lower cross member when the portion of the upper cross member overlaps the portion of the lower cross member.

5. The vehicle according to claim 4, wherein a front surface of the lower cross member includes a first portion that corresponds to the rear surface, and a second portion that does not correspond to the rear surface; and
   the first portion is positioned ahead of the second portion in the direction along the lower intermediate connecting axis.

6. The vehicle according to claim 1, wherein a maximum width of the upper cross member in the up-down direction of the body frame is smaller than a maximum width of the lower cross member in the up-down direction of the body frame.

7. The vehicle according to claim 1, wherein the left front wheel is able to turn about a left steering axis extending in a direction along the left side member;
   the right front wheel is able to turn about a right steering axis extending in a direction along the right side member;
   the left portion of the upper cross member is connected to the upper portion of the left side member via an upper left connecting portion;
   the right portion of the upper cross member is connected to the upper portion of the right side member via an upper right connecting portion;
   the left portion of the lower cross member is connected to the lower portion of the left side member via a lower left connecting portion;
   the right portion of the lower cross member is connected to the lower portion of the right side member via a lower right connecting portion;
   a distance in a direction along the lower left connecting axis between the left steering axis and an end portion of the lower left connecting portion that is farthest from the left steering axis is longer than a distance in the direction along the upper left connecting axis between the left steering axis and an end portion of upper left connecting portion that is farthest from the left steering axis; and
   a distance in a direction along the lower right connecting axis between the right steering axis and an end portion of the lower right connecting portion that is farthest from the right steering axis is longer than a distance in the direction along the upper right connecting axis between the right steering axis and an end portion of upper right connecting portion that is farthest from the right steering axis.

8. The vehicle according to claim 1, further comprising:
   a left suspension supporting the left front wheel and supported by the left side member so as to be able to turn relative to the left side member;
   a right suspension supporting the right front wheel and supported by the right side member so as to be able to turn relative to the right side member;
   an upper left side bearing holding the left suspension at the upper portion of the left side member;
   a lower left side bearing holding the left suspension at the lower portion of the left side member;

an upper right side bearing holding the right suspension at the upper portion of the right side member; and a lower right side bearing holding the right suspension at the lower portion of the right side member; wherein a lowermost end of the lower left side bearing and a lowermost end of the lower right side bearing are positioned below a lower end of the lower cross member when the body frame is in the upright state.

\* \* \* \* \*